(12) United States Patent
Kinno et al.

(10) Patent No.: US 8,301,433 B2
(45) Date of Patent: Oct. 30, 2012

(54) SOFTWARE BEHAVIOR MODELING APPARATUS, SOFTWARE BEHAVIOR MONITORING APPARATUS, SOFTWARE BEHAVIOR MODELING METHOD, AND SOFTWARE BEHAVIOR MONITORING METHOD

(75) Inventors: Akira Kinno, Yokohama (JP); Takehiro Nakayama, Yokohama (JP); Atsushi Takeshita, Yokohama (JP); Kazuhiko Kato, Tsukuba (JP); Hirotake Abe, Toyohashi (JP); Katsuhiro Suzuki, Takatsuki (JP)

(73) Assignees: NTT DoCoMo, Inc., Tokyo (JP); The University of Tsukuba, Tsukuba-shi (JP)

( * ) Notice: Subject to any disclaimer, the term of this patent is extended or adjusted under 35 U.S.C. 154(b) by 733 days.

(21) Appl. No.: 12/296,999

(22) PCT Filed: Apr. 12, 2007

(86) PCT No.: PCT/JP2007/058061
§ 371 (c)(1),
(2), (4) Date: Mar. 3, 2009

(87) PCT Pub. No.: WO2007/119781
PCT Pub. Date: Oct. 25, 2007

(65) Prior Publication Data
US 2009/0187396 A1 Jul. 23, 2009

(30) Foreign Application Priority Data
Apr. 12, 2006 (JP) ................... 2006-110036

(51) Int. Cl.
*G06F 9/45* (2006.01)

(52) U.S. Cl. .......................................... 703/22
(58) Field of Classification Search ................ 703/22
See application file for complete search history.

(56) References Cited

FOREIGN PATENT DOCUMENTS
JP 2004 126854 4/2004

OTHER PUBLICATIONS

Oka et al. "Intrusion Detection System Based on Binary Code and Execution Stack Analysis", 2003.*
Oka, M. et al., "Intrusion Detection System Based on Binary Code and Execution Stack Analysis", Japan Society for Software Science and Technology Dai 20 Kai Taikai, pp. 1-4 (2003).
Oyama, Y. et al., Optimization of Intrusion Detection System Based on Static Analysis, Transactions of Information Processing Society of Japan: Computing System, vol. 45, No. SIG3, pp. 11 to 20, (2004), (with English abstract).
Feng, H. et al., "Anomaly Detection Using Call Stack Information", IEEE Symposium on Security and Privacy. 14 pages (2003).
Office Action issued on Aug. 30, 2011 in the corresponding Japanese Patent Application No. 2006-110036 (with English Translation).

* cited by examiner

*Primary Examiner* — Saif Alhija
(74) *Attorney, Agent, or Firm* — Oblon, Spivak, McClelland, Maier & Neustadt, L.L.P.

(57) ABSTRACT

A software behavior modeling apparatus includes: a stack information recording unit, a termination information recording unit, a stack difference information generating unit configured to generate, as stack difference information, information formed by combining information being located from an uppermost stack frame until the termination information is detected, by using the termination information recorded by the termination information recording unit, and a model generating unit configured to generate a software behavior model based on the stack difference information.

14 Claims, 23 Drawing Sheets (A) ListA COUNT CONTINUOUS NUMBER (B) ListB EXTRACTED TERMINATION INFORMATION FIG. 22
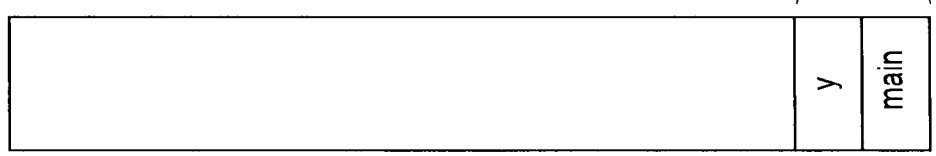
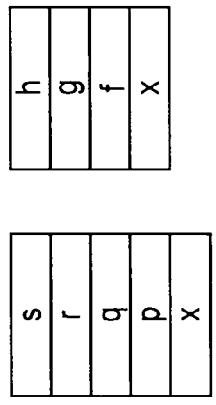

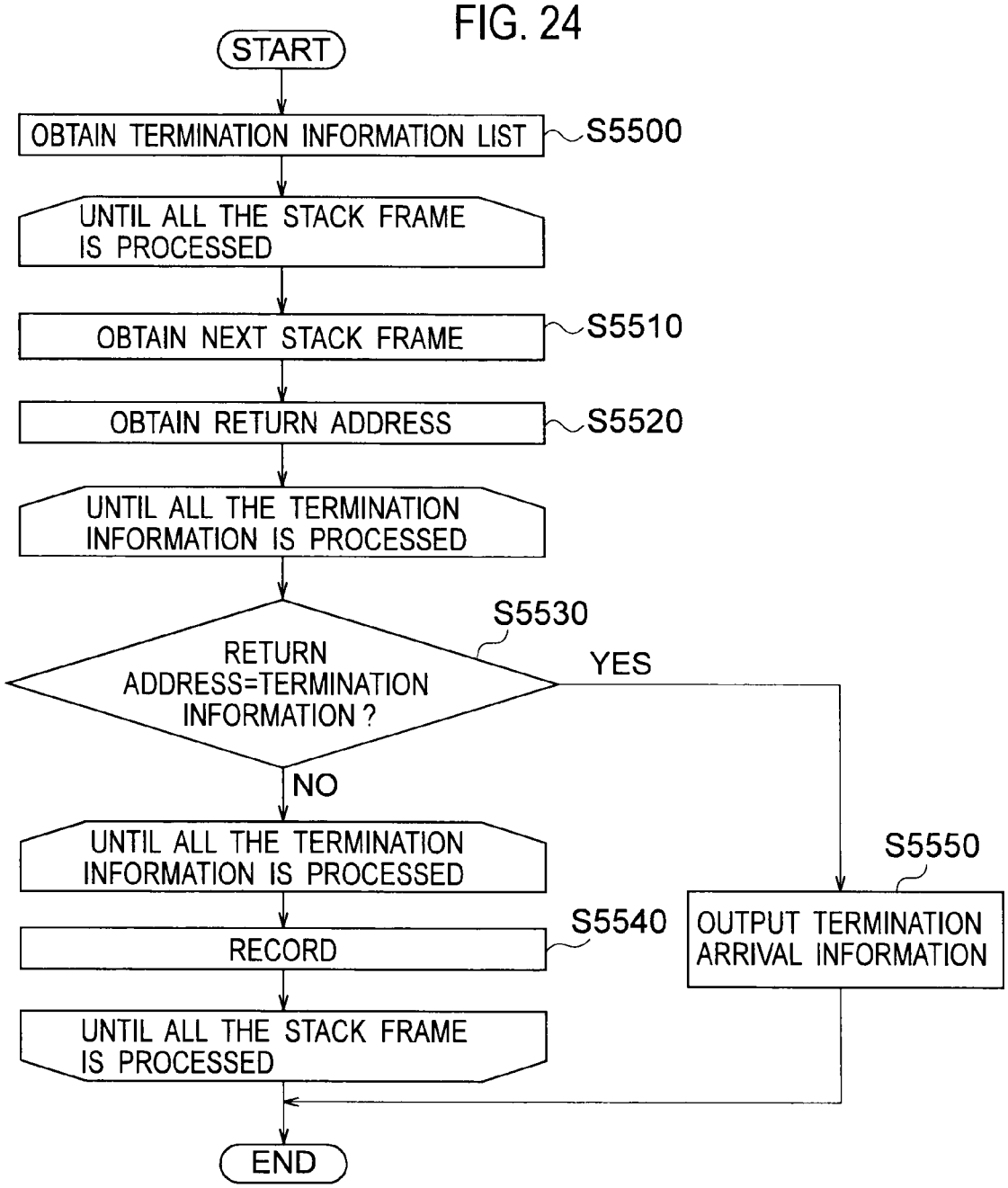

SOFTWARE BEHAVIOR MODELING APPARATUS, SOFTWARE BEHAVIOR MONITORING APPARATUS, SOFTWARE BEHAVIOR MODELING METHOD, AND SOFTWARE BEHAVIOR MONITORING METHOD

FIELD OF THE INVENTION

The present invention relates to a software behavior modeling apparatus, a software behavior monitoring apparatus, a software behavior modeling method, and a software behavior monitoring method.

BACKGROUND OF THE INVENTION

All kinds of computers such as a PC, a workstation, a server, a rooter, a cellular telephone and a PDA are always exposed to attacks from the outside and the inside. A typical attack is one that takes advantage of vulnerability of software being executed on a computer. An attacker sends a malicious code to a computer, which exploits vulnerability of the software, so as to take control of a process being executed. Then, the attacker abusively manipulates the computer by utilizing the authority of the process.

In order to detect the attack that exploits vulnerability, especially, to detect an unknown attack, an anomaly detection system can be considered. In this system, the normal behavior of software is modeled in advance. Then, it is determined whether there is a difference between the normal behavior and the behavior of software being executed. A system call is an instruction made by a process when the process requests a kernel to perform processing important for the system. An attacker exploits a system call requested by a process, and thereby causes the system to perform an arbitrary behavior intended by the attacker. For this reason, when the behavior of software is monitored, the validity of a system call is examined (e.g., refer to JPA 2004-126854 (hereinafter referred to as JPA 2004-126854); Feng, H. et al., "Anomaly Detection Using Call stack Information," The proc. of IEEE Symposium on Security and Privacy 2003, p. 62.; and Abe et al., "Seiteki_Kaiseki_ni_Motoduku_Sin-nyuu_Kenchi_Shisutemu_no_Saitekika (Optimization of Intrusion Detection System Based On Static Analysis)," IPSJ (Information Processing Society of Japan) Journal, Vol. 45, No. SIG3(ACS 5), pp. 11-202).

An attack countermeasure device described in JPA 2004-126854 includes a system call table, a validity determination function unit, an attack countermeasure function unit and a system call. In the device, it is judged as normal when a function of a system call issuer locates in a code region of a memory. The system call table receives a system call request issued from the software (a task), and then outputs a jump address for calling a validity determination function. The validity determination function unit determines the validity of the system call request based on a return address of a system call issuer, the return address being stored in a predetermined region of the memory by the OS when the system call request is issued. The validity determination function unit then outputs the result of the determination. When the validity determination function unit determines that the system call request is invalid, the validity determination function unit discards the system call request. The attack countermeasure function unit receives the result of the determination on the invalid system call request made by the validity determination function unit, and then takes a countermeasure. The system call is called upon receipt of the result of the determination on the invalid system call request made by the validity determination function unit, and causes an instruction to be executed.

In an attack detection system described in "Anomaly Detection Using Call stack Information," the state of a call stack (a column of return addresses stacked in stack) is utilized in order to verify the validity of a system call. In this system, first, software (a program) is executed in advance, and the system learns a model from the result obtained by the execution. The system obtains the state of a call stack at the time when a system call is made during the execution of the program, and generates a virtual stack list in which the state of the call stack and the program counter at the time of the system call issuance are recorded. In addition, the system generates information on a difference between the present virtual stack list and the previous virtual stack list. That is, the system sequentially compares and verifies the state of the call stack in the present virtual stack list, which is a target for comparison, with the state of the call stack in the previous virtual stack list from the lowermost stack level, and thereby detects a different return address therebetween. Thereafter, the system generates a column of return addresses subsequent to the detected different return address (virtual path). The system generates hash tables respectively from the generated virtual stack list and virtual path so as to utilize the generated hash tables as the model for the software. When the system verifies the behavior of the software, the system firstly generates the virtual stack list and the virtual path during the execution of the software. Then, the system performs matching for the generated virtual stack list and virtual path, with and the respective hash tables, which are of the hash tables as the model for the software. When the generated value matches the value of the hash table, the system gives permission to the system call request. Meanwhile, if the generated value does not match the value of the hash table, the system determines that the value is anomaly.

In an attack detection system described in "Optimization of an intrusion detection system based on static analysis," the state of a call stack (a column of return addresses stacked in stack) is utilized in order to verify the validity of a system call. This system analyzes a binary code of software to be monitored so as to generate function definitions and automatons for the function definitions. These automatons are generated respectively for functions, and are used for monitoring the control flow of the software. A node is defined as one of (1) entry of function, (2) exit of function, and (3) call of function. During the execution of software to be monitored, this system suspends the software for each time a system call is issued, so as to check the state of the call stack at the time. Then, the system creates, from the column of return addresses, a list of functions (referred to as a stack back trace) that have been called. When i is set as a natural number, the system compares the (i−1)-th stack back trace and the i-th stack back trace, and verifies whether or not a control flow from the former stack back trace to the latter stack back trace locates in the models (the automatons).

In an Operating System such as Linux, a normal system call is issued through a Wrapper function. Since the Wrapper function locates in a code region, a function of a system call issuer always locates in the code region. In addition, in the case of a Return-to-libc attack that is a major attack, an attacker causes the system to return to libc so that an arbitrary system call is issued. Considering the above situation, an attack that cannot be detected by the attack countermeasure device described in JPA 2004-126854 is located, since in the device described in JPA 2004-126854, a system is validated when the address of a function of a system call issuer locates in a code region. Here, the attack detection systems described in both "Anomaly Detection Using Call stack Information" and "Optimization of an intrusion detection system based on static analysis" make verification by using a column of return addresses stacked in call stack. Accordingly, it can be said that these systems perform more detailed modeling than the attack countermeasure device of JPA 2004-126854 does. For this reason, false negatives can be reduced more than in the case of JPA 2004-126854.

DISCLOSURE OF THE INVENTION

Both of JPA 2004-126854 and "Anomaly Detection Using Call stack Information" are based on the assumptions that the software is verified during the execution of the programs. However, in order to install a system for verifying behaviors of the software on computers with low processing performance, such as cellular telephones, it is important to increase the processing performance with a limited resource and to reduce the use of memory.

Particularly, in "Anomaly Detection Using Call stack Information," the state of a call stack is included in a model for the purpose of increasing the accuracy. For this reason, it is necessary to grasp the state of the call stack at each time a system call is issued. In order to grasp the state of a call stack, the system needs to search the call stack by using a stack pointer (SP) and a base pointer (BP), and then to sequentially obtain stack frame information (positions, return addresses, canary, and the like). However, since a call stack is developed on a memory, and this causes slow memory accesses so frequently that time overhead is high.

Especially, in "Optimization of an intrusion detection system based on static analysis," the system monitors the state of a call stack for the purpose of enhancing the accuracy. For this purpose, the system needs to verify a control flow by reading a model for each of functions listed on a stack back trace. In order to increase the speed of monitoring, the model having been read may be cached by using an LRU algorithm. However, an incorporated device has a limited memory. Accordingly, storing a model, which may eventually not be used, in the memory may result in reducing the available memory capacity. As a result, the processing of software to be monitored may be significantly deteriorated.

The present invention has been made in view of the foregoing problems, and has an object of providing a software behavior modeling apparatus, a software behavior monitoring apparatus, a software behavior modeling method, and a software behavior monitoring method, which can accurately detect attacks from outside, and can reduce time overhead and space overhead.

A first aspect of the present invention is summarized as a software behavior modeling apparatus, including: (a) a stack information recording unit configured to obtain stack frame information for identifying a stack frame stacked on a call stack at a time when a specific event occurs in executing a software under a software execution environment, while specifying an order that the stack frame is stacked on the call stack, and to record the stack frame information in an order of an occurrence of the specific event; (b) a termination information recording unit configured to compare, sequentially from a bottom of the call stack, (i−1)-th stack information with i-th stack information both recorded by the stack information recording unit, where i represents a natural number, and to record termination information that is a stack frame information indicating a boundary between an identical portion and a non-identical portion, where the identical portion indicates a portion where the (i−1)-th stack information and the i-th stack information are identical in terms of a position of the call stack and the stack frame information, and the non-identical portion indicates a portion following a stack frame in which the stack frame information is detected as being different between the (i−1)-th stack information and the i-th stack information; (c) a first stack difference information generating unit configured to generate, as stack difference information, information formed by combining a portion of the (i−1)-th stack information with a portion of the i-th stack information, both portions being located from an uppermost stack frame until the termination information is detected, by using the termination information recorded by the termination information recording unit; and (d) a model generating unit configured to generate a software behavior model based on the stack difference information.

According to the software behavior modeling apparatus of the first aspect, it is possible to record the termination information for each of the software. The termination information is information for setting a portion where the searching of a call stack is suspended in monitoring, to be a position (in some cases, a vicinity of the position) of original termination information. In addition, it is possible to generate a model that can be used even in a case where the searching of a call stack is suspended by using the termination information for monitoring. Thus, space overhead and time overhead can be reduced in the software behavior monitoring.

In the software behavior modeling apparatus according to the first aspect, the termination information recording unit may record termination information having a high co-occurrence frequency with an identifier of the specific event, together with the identifier of the specific event, and the stack difference information generating unit may obtain termination information to be used for generating the stack difference information, from each of the termination information recorded by the termination information recording unit, by using the identifier of the specific event.

In this software behavior modeling apparatus, by recording the termination information having a strong co-occurrence relation with a specific event (a system call or the like), the termination information specialized for each specific event can be used in monitoring.

Further, in the software behavior modeling apparatus according to the first aspect, the termination information recording unit may record, as the termination information, stack frame information that is located at a certain position viewed from the bottom of the call stack for an arbitrary time period, from time series of the stack information recorded in the stack information recording unit.

In this software behavior modeling apparatus, the number of pieces of termination information to be recorded can be decreased while maintaining small difference (a difference in position within a call stack) between the termination information to be recorded and the original termination information.

Further, the termination information recording unit may grasp a length of time period during which the stack frame information is located at the certain position viewed from the bottom of the call stack, and record, as the termination information, the stack frame information having a long length of the time period.

In addition, the software behavior modeling apparatus according to the first aspect may further include: a model obtaining unit configured to obtain a software behavior model for a software to be monitored, the software behavior model being generated by the model generating unit; a termination information obtaining unit configured to obtain the termination information recorded by the termination information recording unit; a stack information obtaining unit configured to suspend obtaining the stack frame information from the call stack when the termination information transmitted from the termination information obtaining unit is detected in searching the call stack, and to record the stack frame information in the order of the occurrence of the specific event; a second stack difference information generating unit configured to generate, as stack difference information, information formed by combining a portion of the (i−1)-th stack information and a portion of the i-th stack information, both of the (i−1)-th stack information and the i-th stack information being obtained by the stack information obtaining unit; and a behavior monitoring unit configured to determine a difference between the stack difference information generated by the second stack difference information generating unit, and the software behavior model obtained by the model obtaining unit.

According to this software behavior modeling apparatus, in addition to the realization of modeling and monitoring on the same equipment, highly efficient searching of a call stack by using termination information, can be achieved.

Moreover, in the software behavior modeling apparatus according to this aspect, the stack frame information may be a return address.

According to this software behavior modeling apparatus, it is possible to obtain information for identifying stack frames without correcting a call stack.

A second aspect of the present invention is summarized as a software behavior monitoring apparatus, including: (a) a model obtaining unit configured to obtain a function model for each specific events issued by a software to be monitored, the function model that indicates a co-occurrence relation between a function call and an order of an issuance of an arbitrary function return, executed between specific events issued by a software to be monitored; (b) a termination information obtaining unit configured to obtain termination information suitable for the software to be monitored, under a software execution environment; (c) a stack information obtaining unit configured to obtain stack frame information for identifying a stack frame stacked on a call stack at a time when a specific event occurs in executing the software, while specifying an order that the stack frame is stacked on the call stack, to suspend obtaining the stack frame information from the call stack when the termination information transmitted from the termination information obtaining unit is detected in searching the call stack, and to record the stack frame information in an order of an occurrence of the specific event; (d) a stack difference information generating unit configured to generate, as stack difference information, information formed by combining a portion of the (i−1)-th stack information and a portion of the i-th stack information, both of the (i−1)-th stack information and the i-th stack information being obtained by the stack information obtaining unit; and (e) a behavior monitoring unit configured to determine a difference between the stack difference information generated by the stack difference information generating unit, and the software behavior model obtained by the model obtaining unit.

According to the software behavior monitoring apparatus of the second aspect, the searching of the call stack can be suspended by using the termination information obtained in a learning time. As a result, it is possible to reduce overhead for monitoring. Particularly, the termination information obtaining unit obtains information having a high co-occurrence frequency with the specific events, together with the identifier of the specific event. In confirming the suspension of the searching of a call stack, it is possible to use termination information having a strong co-occurrence relation with a specific event. Accordingly, suspension suitable for the specific event can be performed.

The software behavior monitoring apparatus according to the second aspect may further include: a model discard unit configured to discard the function model recorded by the model obtaining unit. The model obtaining unit may obtain the function model that indicates a call relation between functions, the call relation being generated in advance for each of the functions from codes of the software to be monitored. The behavior monitoring unit may determine the difference between the stack difference information generated by the stack difference information generating unit, and the function model obtained by the model obtaining unit. The stack information obtaining unit may suspend obtaining the stack frame information when the termination information transmitted from the termination information obtaining unit is detected in searching the call stack. The model discard unit may discard function model that is recorded by the model obtaining unit for monitoring previously generated stack difference information, when the stack information obtaining unit suspends obtaining the stack frame information.

According to this software behavior monitoring apparatus, unnecessary function models remaining on a memory can be eliminated so that an amount of memory to be used can be reduced.

The discarding function models could lead to the discarding of a function model necessary for verifying stack difference information at the time when the next system call occurs. For this reason, the termination information obtaining unit obtains information recording stack frame information that is located at a certain position viewed from the bottom of a call stack for an arbitrary time period, from the series of the stack information recorded in the stack information recording unit. Thereby, only function models having not been used for a certain period of time can be discarded in verifying. As a result, the risk of discarding necessary function models can be reduced at the time of discarding function models by using the termination information Further, in the software behavior monitoring apparatus according to the second aspect, the termination information recording unit may record, as the termination information, information recording stack frame information that is located at a certain position viewed from the bottom of the call stack for an arbitrary time period, from time series of the stack information recorded in the stack information recording unit.

According to this software behavior monitoring apparatus, it is possible to achieve efficiency, for example, by caching a confirmation result of termination information.

In addition, the termination information recording unit may obtain, as the termination information, information recording the stack frame information having a long length of the time period during which the stack frame information is located at the certain position viewed from the bottom of the call stack.

In the software behavior monitoring apparatus according to the second aspect, the model discard unit may grasp an amount of a memory currently used by a system, and may determine whether or not to discard the function model by using the termination information.

Depending on the amount of available memory, the caching of function models by means of an LPU algorithm or the like may lead to a greater possibility that time overhead can be reduced without discarding function models. For this reason, by grasping the amount of memory currently used, the model discard unit performs switching on whether or not to discard function models by using the termination information.

Thereby, the model discard unit can discard function models only when necessary. Accordingly, the risk can be reduced.

Further, the software behavior monitoring apparatus of the second aspect may further include: a model storing unit configured to store the function model. The model obtaining unit may add an identifier to an obtained function model so as to record, in the model storing unit, the obtained function model to which the identifier is added. The model discard unit may transmit, to the model storing unit, a discard instruction for specifying a function model to be discarded, by using the identifier.

According to this software behavior modeling apparatus, function models to be discarded can be identified.

A third aspect of the present invention is summarized as a software behavior modeling method, including: (a) obtaining stack frame information for identifying a stack frame stacked on a call stack at a time when a specific event occurs in executing a software under a software execution environment, while specifying an order that the stack frame is stacked on the call stack; (b) recording the stack frame information in an order of an occurrence of the specific event; comparing, sequentially from a bottom of the call stack, (i−1)-th stack information with i-th stack information both recorded by the stack information recording unit, where i represents a natural number; and recording termination information that is a stack frame information indicating a boundary between an identical portion and a non-identical portion, where the identical portion indicates a portion where the (i−1)-th stack information and a i-th stack information are identical in terms of a position of the call stack and the stack frame information, and the non-identical portion indicates a portion following a stack frame in which the stack frame information is detected as being different between the (i−1)-th stack information and the i-th stack information; (c) generating, as stack difference information, information formed by combining a portion of the (i−1)-th stack information with a portion of the i-th stack information, both of the portions being located from an uppermost stack frame until the termination information is detected, by using the termination information recorded by the termination information recording unit; and (d) generating a software behavior model based on the stack difference information.

Furthermore, a fourth aspect of the present invention is summarized as a software behavior monitoring method, including: (a) obtaining specific events issued by a software to be monitored, and a function model for each specific events, the function model indicating a co-occurrence relation between a function call and an order of an issuance of an arbitrary function return, executed between specific events; (b) obtaining termination information suitable for the software to be monitored, under a software execution environment; (c) obtaining stack frame information for identifying a stack frame stacked on a call stack at a time when a specific event occurs in executing a software, while specifying an order that the stack frame is stacked on the call stack; suspending obtaining of the stack frame information from the call stack when the termination information transmitted from the termination information obtaining unit is detected in searching the call stack; and recording the stack frame information in an order of an occurrence of the specific event; (d) generating, as stack difference information, information formed by combining a portion of (i−1)-th stack information and a portion of i-th stack information, both of the (i−1)-th stack information and the i-th stack information being obtained by the stack information obtaining unit; and (e) determining a difference between the stack difference information generated by the stack difference information generating unit, and the software behavior model obtained by the model obtaining unit.

BRIEF DESCRIPTION OF THE DRAWINGS

FIG. 22 shows examples of discard of the function model according to the third embodiment.

FIG. 23 is an example of a discard policy according to the third embodiment.

FIG. 24 is a flowchart showing a software behavior monitoring method according to the third embodiment.

DETAILED DESCRIPTION OF THE EMBODIMENTS

Next, embodiments of the present invention will be described with reference to the accompanying drawings. In <First Embodiment>
(Software Behavior Modeling Apparatus)

Figure 1:
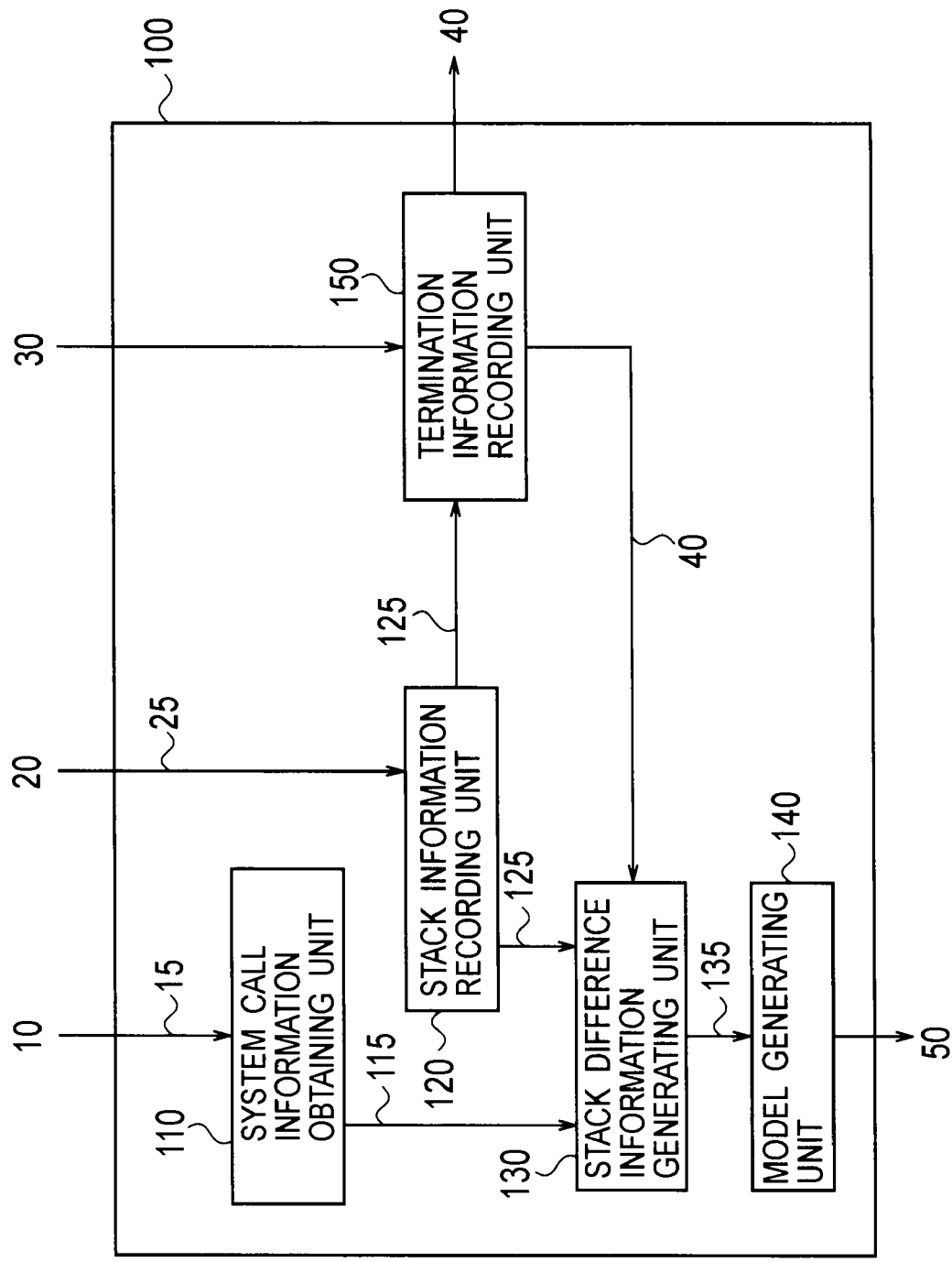
FIG. 1 is a block diagram showing a configuration of a software behavior modeling apparatus according to a first embodiment.

As shown in FIG. 1, a software behavior modeling apparatus 100 according to the first embodiment generates and outputs model information 50 and termination information 40 by using a monitoring target process 10, a memory space 20 used by the monitoring target process 10, and a threshold 30 as necessary. The model information represents a normal behavior of the monitoring target process 10. Here, the "monitoring target process 10" is an execution configuration of software whose behavior is to be monitored. A monitoring instruction of the monitoring target process 10 may be given from the outside by a user, or may be given through meta information that is added to the software by a person delivering the software.

The software behavior modeling apparatus 100 includes a system call information obtaining unit 110, a stack information recording unit 120, a stack difference information generating unit 130, a model generating unit 140, and a termination information recording unit 150.

The system call information obtaining unit 110 detects a system call 15 issued by the monitoring target process 10, and causes the monitoring target process 10 to be in a waiting state from the time of the detection of the system call 15 until the stack information recording unit 120 records stack information. Moreover, the system call information obtaining unit 110 obtains system call information 115 containing a system call number and the like, from the system call 15. The system call information obtaining unit 110 can be realized with a debag tool, but can be easily realized by using "ptrace" implemented in Linux.

Incidentally, in the software behavior modeling apparatus 100 of the first embodiment, although a system call issued by the monitoring target process 10 is used as a specific event, the system call is not only one event to be used in the present invention. Specific events other than the system call include, for example, a jmp instruction. For example, a software behavior modeling apparatus can detect the jmp instruction, since the jmp instruction can be obtained by performing one step execution by using the ptrace implemented in Linux.

The stack information recording unit 120 obtains a state of a call stack at the time when the system call information obtaining unit 110 detects the system call, from the memory space 20 used by the monitoring target process. Here, the "state of the call stack" indicates a state in which stack frames are stacked. Information for identifying the stack frames is obtained from the "state of the call stack." Here, the "information for identifying the stack frames" includes, for example, a return address, a canary or the like. A canary is a value used for blocking a stack smashing attack that exploits buffer overflow vulnerability. The canary is inserted for each stack frame. When a canary indicates a value different from the value obtained at the time when a stack frame is generated, the stack frame can be detected as being destructed by a stack smashing attack. It is pointless if a canary can be estimated by an attacker. For this reason, a random number is used as a canary in many cases. However, it is also possible to add to the canary information with which a stack frame can be identified. By designing a canary in this manner, identifying a stack frame becomes possible by obtaining the canary.

The description will be given in detail in the first embodiment in an example that stack frame is identified by using return addresses. That is, only a return address is extracted from the state of a call stack, so as to be outputted as the stack information. Various ways can be employed for the extraction. In a call stack such as x86 or ARM, a return address locates at the uppermost level (opposite to the bottom) of a stack frame. For this reason, by using a stack pointer and a base pointer retained in a register, a value immediately below the base pointer can be obtained to be extracted. Stack information is recorded in time series by the stack information recording unit 120, at the timing of the issuance of each system call.

The termination information recording unit 150 compares, sequentially from the bottom, (i−1)-th stack information with i-th stack information both recorded by the stack information recording unit 120. Here, the termination information recording unit 150 records termination information that is a stack frame information indicating a boundary between an identical portion and a non-identical portion, where the identical portion indicates a portion where the (i−1)-th stack information and the i-th stack information are identical in terms of a position of the call stack and the stack frame information, and the non-identical portion indicates a portion following a stack frame where the stack frame information is detected as being different between the (i−1)-th stack information and the i-th stack information. Then, the termination information recording unit 150 creates a boundary between the identical portion and the non-identical portion. A return address corresponding to the terminal of the non-identical portion is referred to as "termination information."

Figure 2:
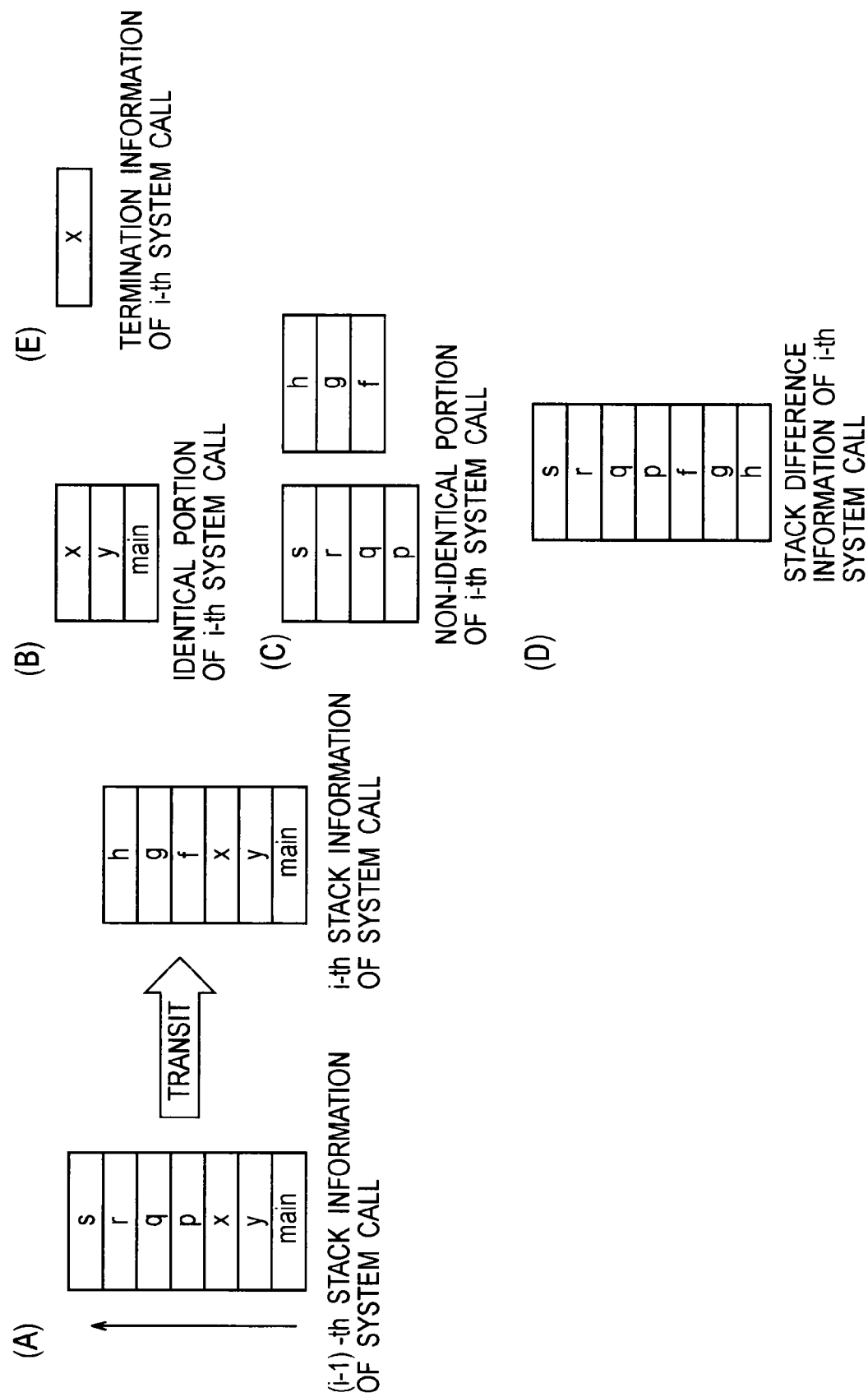
FIG. 2 shows examples of stack information, stack difference information, and termination information, according to the first embodiment.

FIG. 2 shows examples of stack information, an identical portion, a non-identical portion, stack difference information and termination information, respectively. When (i−1)-th stack information is compared with i-th stack information as shown in FIG. 2(A), an identical portion is as shown in FIG. 2(B), and non-identical portions are as shown in FIG. 2(C). Since the return address that divides the identical portion and the non-identical portion is "x," the termination information is x as shown in FIG. 2(E). In addition, stack difference information used in modeling is information formed by combining the non-identical portions, as shown in FIG. 2(D). When the stack difference information is generated, the following process is performed. Specifically, identical portions are first removed from stack information. Then, non-identical portions are extracted. In this case, it is necessary to sequentially verify stack information from the bottom. However, search for a call stack is sequentially performed from the upper level of the stack to the bottom thereof, since a stack pointer is located at the upper level (opposite to the bottom). For this reason, it can be said that all the return addresses stacked in the call stack are required to be obtained. However, the termination information is located on the boundary between "information to be removed" and "information to be extracted." Accordingly, by listing in advance the termination information, and by then using the listed termination information at the time of searching the call stack, it is possible to suspend the process without obtaining all the return addresses.

Figure 3:
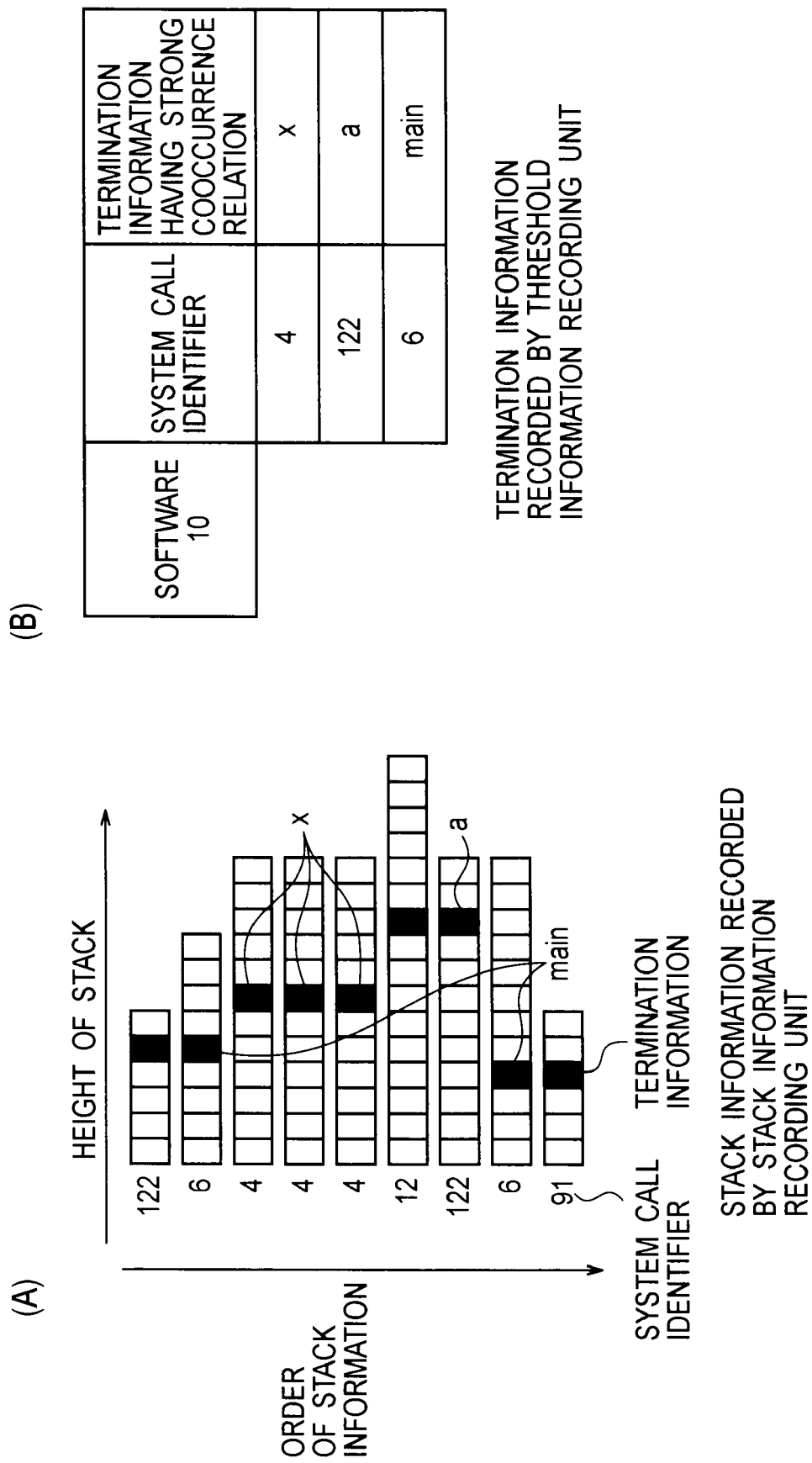
FIG. 3 shows examples of stack information and termination information according to the first embodiment.

The termination information recording unit 150 records the termination information 40 from stack information 125A recorded by the stack information recording unit 120, by using the threshold 30 as necessary. Since the termination information locates in recorded stack information in large amounts, all of them may be listed, or information useful in searching call stacks may be extracted. For example, since stack information is generated at the time of a system call, the termination information recording unit 150 may grasp a co-occurrence relation between a system call identifier and termination information, and record the termination information having a higher co-occurrence frequency. FIG. 3(A) shows an example of stack information recorded by the stack information recording unit 120. By examining a co-occurrence frequency between the system call identifier and the termination information, termination information having a higher co-occurrence frequency is extracted for each system call. FIG. 3(B) shows an example of termination information extracted in this way.

In the first example, description will be given in detail of an example in which termination information, which locates at a certain position when viewed from the bottom of a call stack for a period of time being not less than an arbitrary threshold, is extracted. A function for controlling a program (or a module), typified by a main function, or the like locates a certain position in a call stack for a long period of time. In many cases, the return addresses located below the certain position where the call stack is located for a long period of time have the i-th stack information same as the (i−1)-th stack information. Accordingly, a return address existing at a certain position for a long time period is highly likely to be the original termination information. Accordingly, it is conceivable that termination information is not necessarily a return address that locates on a boundary between an identical portion and a non-identical portion. Alternatively, a return address that locates at a certain position in a call stack for a long time period may be extracted as the termination information.

Figure 4:
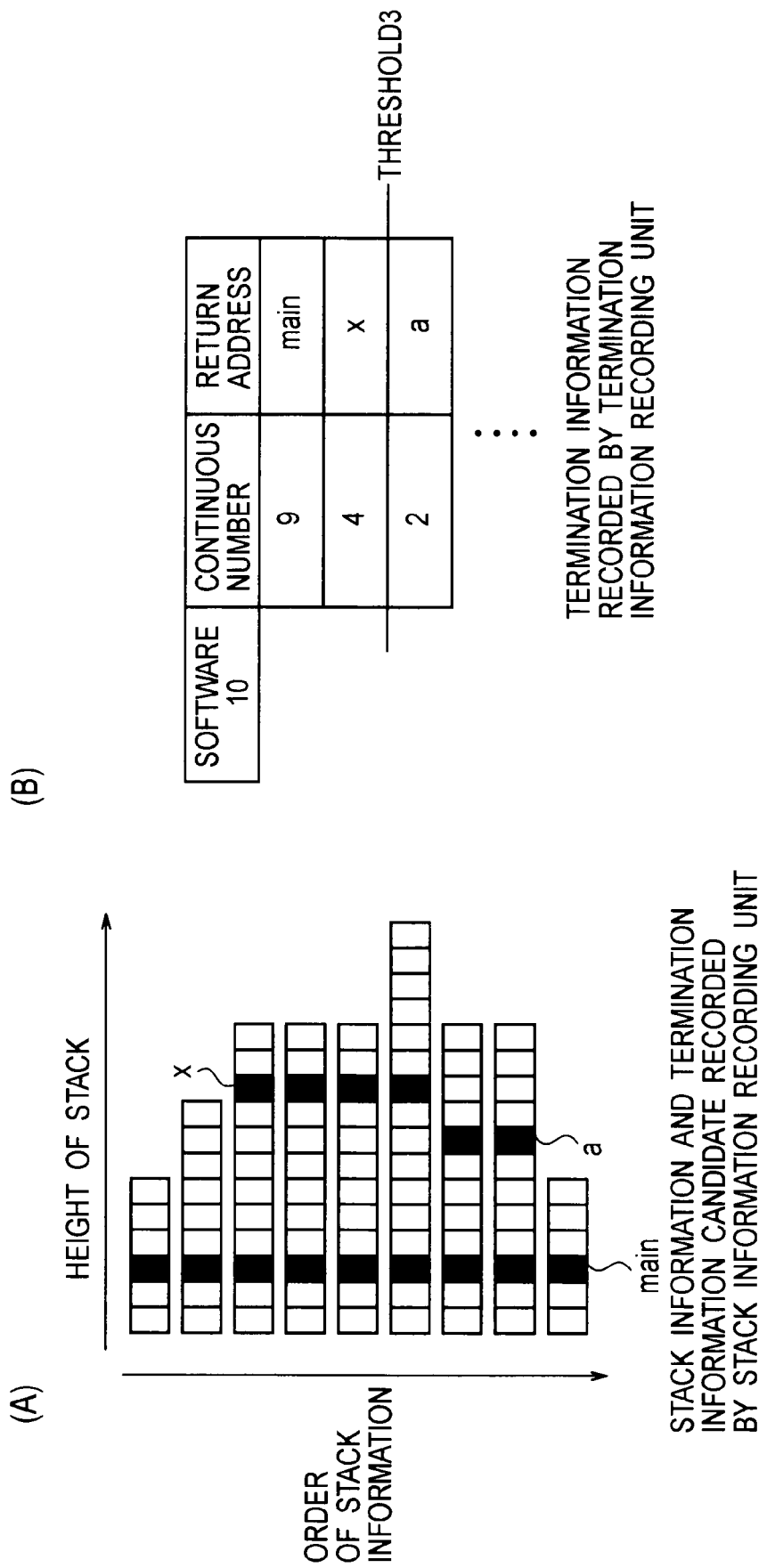
FIG. 4 shows examples of stack information and termination information according to the first embodiment.

FIG. 4(A) shows an example of stack information recorded by the stack information recording unit 120. In the stack information, "main" and "X," "a" are return addresses each having located at a certain position for a long period. Such return addresses having continuously located for long periods are extracted. Alternatively, by providing a threshold, a return address having a length longer than the threshold may be extracted as termination information. In FIG. 4(B), the threshold is 3, and then "main" and "X" are extracted as termination information.

The software behavior modeling apparatus 100 outputs the termination information 40 obtained by the termination information recording unit 150, and then generates stack difference information by using the termination information 155.

The stack difference information generating unit 130 generates stack difference information 135 based on the stack information, the termination information 40, and the system call information 115. Here, the stack difference information generating unit 130 generates the stack difference information by extracting the non-identical portion between the (i−1)-th stack information and the i-th stack information, and combining the extracted non-identical portion.

The model generating unit 140 generates a behavior model for the monitoring target process 10 based on the stack difference information 135. For example, a hash value of the stack difference information 135 is obtained as in the case of Non-patent document 1, the correlation between a system call identifier and stack difference information is derived; or the like.

(Method of Modeling a Software Behavior)

Figure 5:
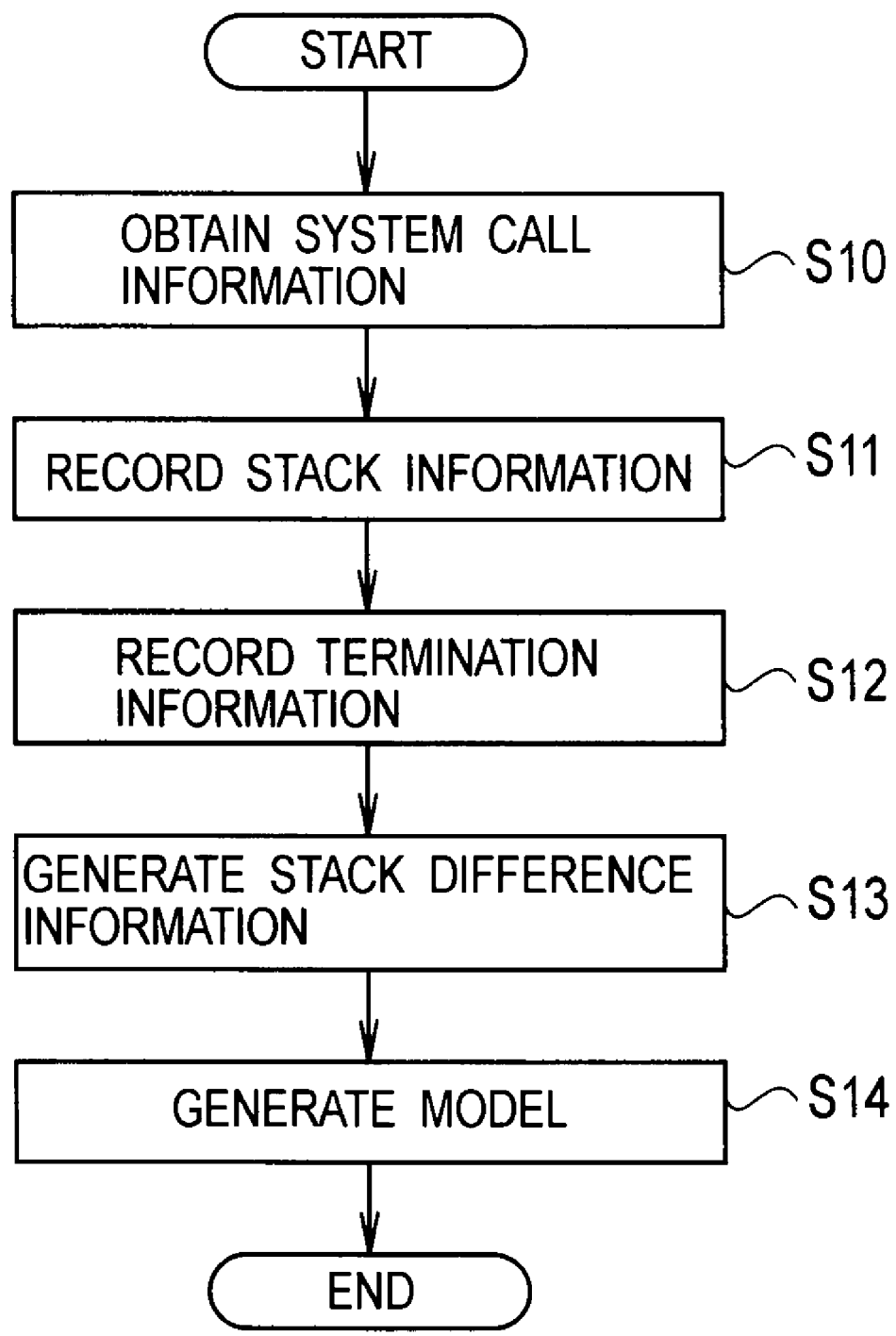
FIG. 5 is a flowchart showing a software behavior modeling method according to the first embodiment.

Next, description will be given of a method of modeling a software behavior, according to the first embodiment with reference to FIG. 5.

First, the system call information obtaining unit 110 detects the system call 15 issued by the monitoring target process 10, and causes the monitoring target process 10 to be in a waiting state from the time when the system call 15 is detected until the stack information recording unit 120 records the stack information. Moreover, the system call information obtaining unit 110 obtains the system call information 115 containing a system call number and the like, from the system call 15 (Step S10).

Subsequently, the stack information recording unit 120 obtains the call stack state 25 at the time when the system call information obtaining unit 110 detects the system call, from the memory space 20 used by the monitoring target process (Step S11).

Next, the termination information recording unit 150 records the termination information 40 from the stack information 125A recorded by the stack information recording unit 120, using the threshold 30 as necessary (Step S12). An example of the operation of the termination information recording unit 150 will be described in detail later.

The stack difference information generating unit 130 receives the stack information 125, the termination information 40 and the system call information 115, and then generates the stack difference information 135 (Step S13). It should be noted that an example of the operation of the stack difference information generating unit 130 will be described in detail later.

Next, the model generating unit 140 generates a behavior model for the monitoring target process 10 from the stack difference information 135 (Step S14).

Next, an example of operations of Step S12 will be described with reference to FIG. 6.

Figure 7:
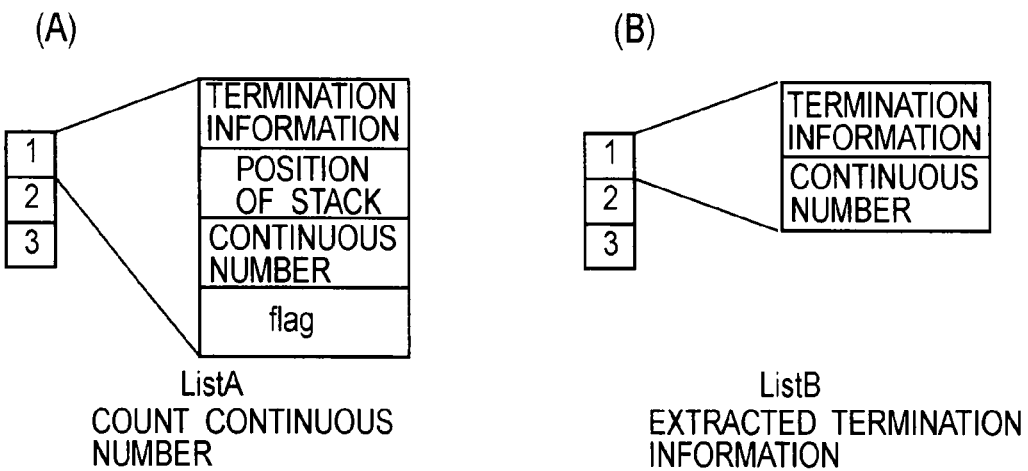
FIG. 7 shows examples of lists used by a termination information recording unit according to the first embodiment.

First, the termination information recording unit 150 uses a List A for counting the length (hereinafter, referred to as a "continuous number") of a period during which each termination information is located at a certain position, and a List B in which each termination information with the corresponding continuous number is stored. FIGS. 7(A) and 7(B) show examples of the List A and List B, respectively. The List A includes: termination information; position of the stack counted from the bottom of the call stack; continuous number of the termination information; and a flag used for determining whether the termination information is counted up after the stack information is examined. The List B includes: termination information and the continuous number.

Figure 6:
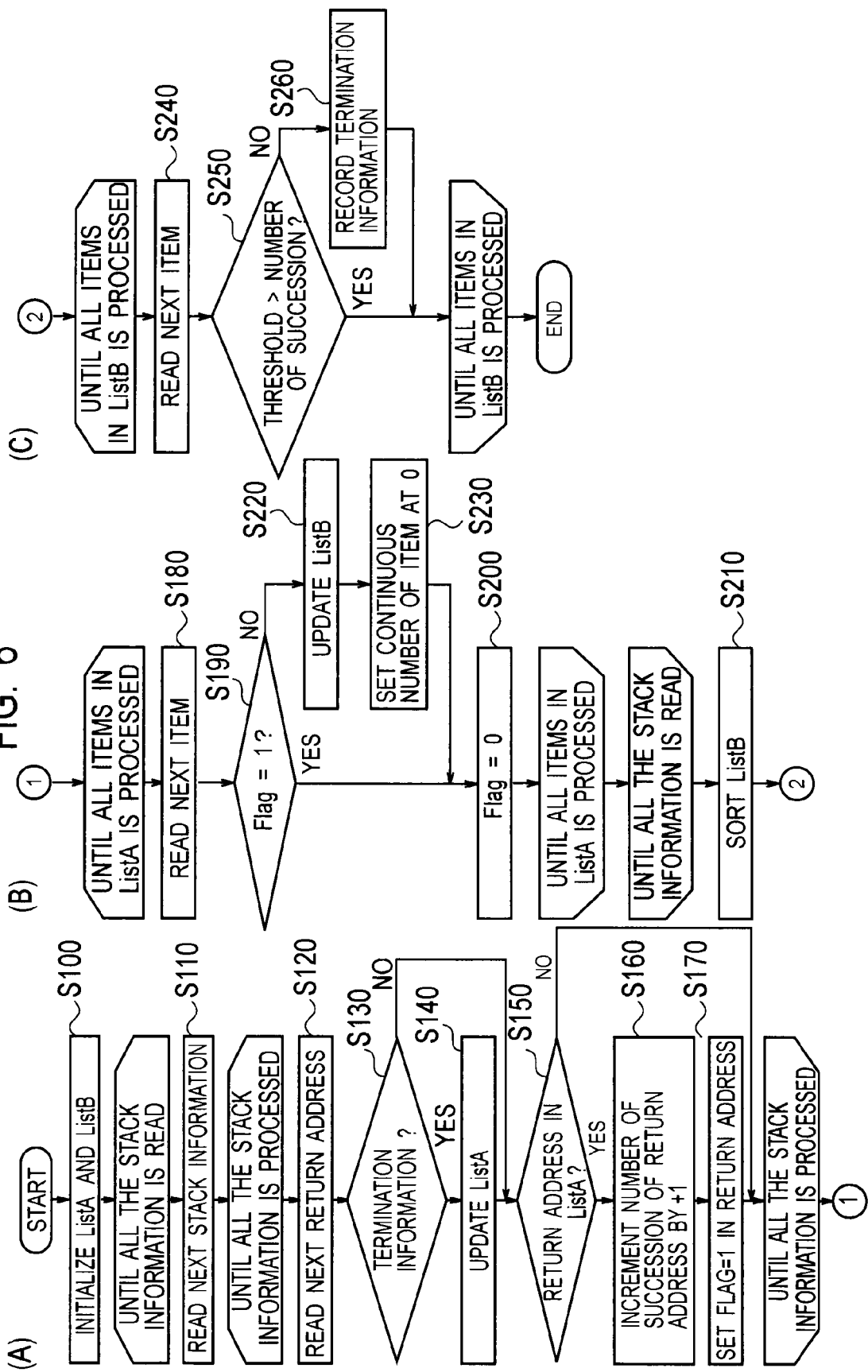
FIG. 6 shows flowcharts showing the details of S12 of FIG. 5.

As shown in FIG. 6, the termination information recording unit 150 firstly initializes the List A and the List B. In other words, the termination information recording unit 150 clears all items in each of the List A and List B (Step S100). Next, the termination information recording unit 150 reads the stack information (Step S110). Subsequently, from the stack information thus read, the termination information recording unit 150 reads return addresses sequentially from the bottom of the call stack (Step S120). Here, from the stack information previously obtained, the termination information recording unit 150 reads a return address located at the same position as the return address read at this time, since, in the next step, the stack information read at this time is to be compared with the stack information previously obtained stack information.

Next, the termination information recording unit 150 compares the return addresses each having been read, with each other, so as to verify whether or not the return addresses thus compared are identical (Step S130). When the return addresses are not identical, the List A is updated by using, as the termination information, the return address read in the previous loop (Step S140). In updating the List A, the termination information recording unit 150 verifies whether or not the termination information is existed in the List A. When the termination information is not existed, the termination information recording unit 150 adds the termination information, the position, a continuous number=0, and a flag=0, to the List A.

When it is determined that the return addresses are identical in Step S130, or after the process in Step S140 is performed, the termination information recording unit 150 verifies whether or not a return address or termination information each located at the same position as the termination information is existed in the List A (Step S150). When the return address or the termination information each located at the same position as the termination information is existed, the continuous number of the termination information is incremented by 1 (Step S160), and the flag is set at 1 (Step S170).

The termination information recording unit 150 repeats the above-described processes of Steps S120 to S170 until all the stack information is processed. Next, the termination information recording unit 150 sequentially reads items stored in the List A (Step S180). Here, the verification is performed on whether or not the flag of the item thus read is 1. When the flag is not 1, it means that the continuation stops, thereby the continuous number of the termination information is determined. Then, the termination information recording unit 150 updates the List B, based on the determined continuous number and the termination information (Step S220). In addition, the termination information recording unit 150 clears the continuous number of the termination information (Step S230). When the flag is 1 in Step S190, or after process in Step S230 is performed, the flag is set at 0 (Step S200).

The termination information recording unit 150 repeats the above-described processes of Step S180 to S200 until all of the items in List A is processed. Moreover, the termination information recording unit 150 repeats the processes of Steps S110 to S200 until all of the stack information is read.

The termination information recording unit 150 sorts the List B thus obtained, based on the continuous numbers (Step S210). Next, the termination information recording unit sequentially reads the items stored in the List B (Step S240). Here, the threshold and the continuous number are compared with each other (Step S250), and when the continuous number is greater than the threshold, termination information is recorded (Step S260). The termination information recording unit 150 repeats the processes of Steps S240 to S260 until all of the List B is processed.

Incidentally, the difference in position between the termination information thus obtained and the termination information that divides an identical portion and a non-identical portion may be recorded in an external recording medium, as the difference information, together with the termination information.

An example of operations in a step of extracting a non-identical portion of Step S13 will be described in detail below with reference to FIG. 8.

First, the stack difference information generating unit 130 obtains the termination information (Step S300). Next, the stack difference information generating unit 130 obtains a stack address from the stack information (Step S310). Then, the stack difference information generating unit 130 verifies whether or not the termination information and the return address are identical (Step S320). When the termination information and the return address are identical, the step of extracting the non-identical portion is terminated. When the termination information and the return address are not identical, the stack difference information generating unit 130 repeats the process of Step S320 until all the termination information is processed. When all the termination information is processed, the stack difference information generating unit 130 determines that return addresses obtained in Step S310 are items of non-identical portions, and records the return addresses (Step S330). The stack difference information generating unit 130 repeats the processes of Steps S310 to S330 until all of the stack information is processed.

The stack difference information generating unit 130 combines the i-th non-identical portion with the (i−1)-th non-identical portion previously obtained. Here, process of combining the non-identical portions is shown with examples. The stack difference information shown in FIG. 2(D) is obtained in such a way that, when non-identical portions are combined in FIG. 2(C), the non-identical portions of the i-th stack information of the system call are reversed in order and then combined. Although this is made by following the way described in Non-patent document 1, it is not necessary to reverse the non-identical portions. This is because, when a model is generated according to a correlation rule between a return address on stack different information and a system identifier, the order does not make any sense. The stack difference information is outputted together with the system call identifier, and then transmitted to the model generating unit 140.

Figure 8:
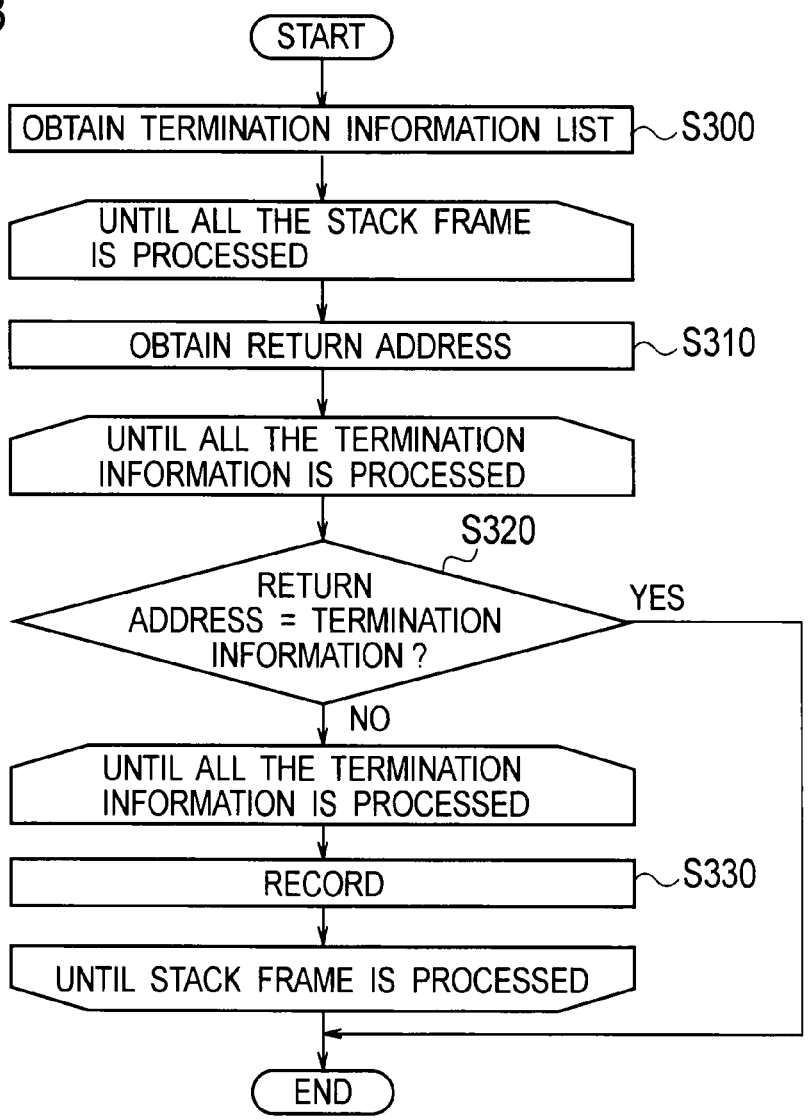
FIG. 8 is a flowchart showing the details of S13 of FIG. 5.

Incidentally, when the difference information is recorded in the termination information recording unit 150, the stack difference information generating unit 130 may additionally obtain and examine the return address for the difference information, without immediately terminating the process, when the stack difference information generating unit 130 determines that the termination information and the return address are identical in Step S320 in FIG. 8. This makes the difference with the original termination information smaller than otherwise, so that a model with higher accuracy can be generated.

(Software Behavior Monitoring Apparatus)

Next, with reference to FIG. 9, description will be given of a software behavior monitoring apparatus that performs normal/abnormal determination for the behavior of the monitoring target process 10, according to the first embodiment.

Figure 9:
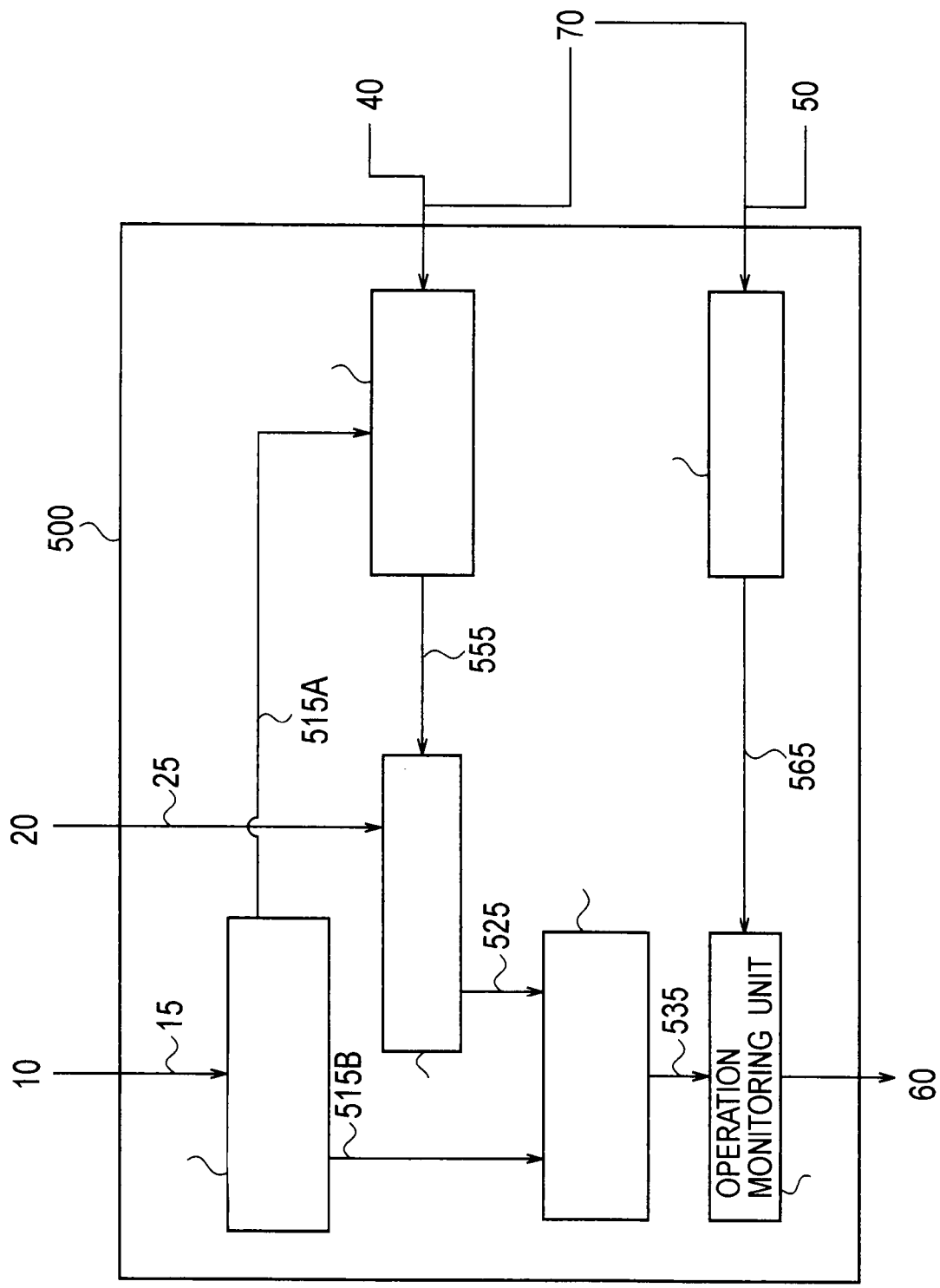
FIG. 9 is a block diagram showing a configuration of a software behavior monitoring apparatus according to the first embodiment.

A software behavior monitoring apparatus 500 according to the first embodiment outputs a determination result 60 by using a memory space 20 utilized by a process to be monitored (a monitoring target process), termination information 40, model information 50, and a software identifier 70, as shown in FIG. 9.

The software behavior monitoring apparatus 500 includes a system call information obtaining unit 510, a stack information obtaining unit 520, a termination information obtaining unit 550, a stack difference information generating unit 530, an behavior monitoring unit 540, and a model obtaining unit 560.

Once the software is loaded, the software behavior monitoring apparatus 500 activates the model obtaining unit 560 that obtains a model 565 suitable for the monitoring of the monitoring target process 10, from the software identifier 70 and the model information 50.

The system call information obtaining unit 510 detects a system call 15 issued by the monitoring target process 10, and causes the monitoring target process 10 to be in a waiting state from the above detection of the system call 15 until the stack information obtaining unit 520 finishes the obtaining of stack information. Further, the system call information obtaining unit 510 obtains system call information from the system call 15. The system call information obtaining unit 510 can be easily realized using ptrace implemented in Linux.

The termination information obtaining unit 550 obtains termination information 555 suitable for the monitoring target process, from the software identifier 70 and the termination information 40, so as to transmit the same to the stack information obtaining unit 520. When termination information is recorded for each of the system call identifier, system call information 515A is further inputted to the termination information obtaining unit 550, and the termination information is selected for each of the system call issued by the monitoring target process 10.

The stack information obtaining unit 520 obtains the state of a call stack (call stack state 25) from the memory space 20 used by the monitoring target process 10, and then generates stack information 525 by using the termination information 555. The stack information obtaining unit 520 obtains information for identifying stack frames from the call stack state 25.

In the first embodiment, the description will be given for an example in which the stack frames are identified by using return addresses in the first embodiment will be described in detail. That is, the stack information obtaining unit 520 obtains return addresses from the call stack state 25. In addition, the stack information obtaining unit 520 suspends obtaining the information (return addresses in the first embodiment) for identifying the stack frames, by using the termination information 555.

Figure 10:
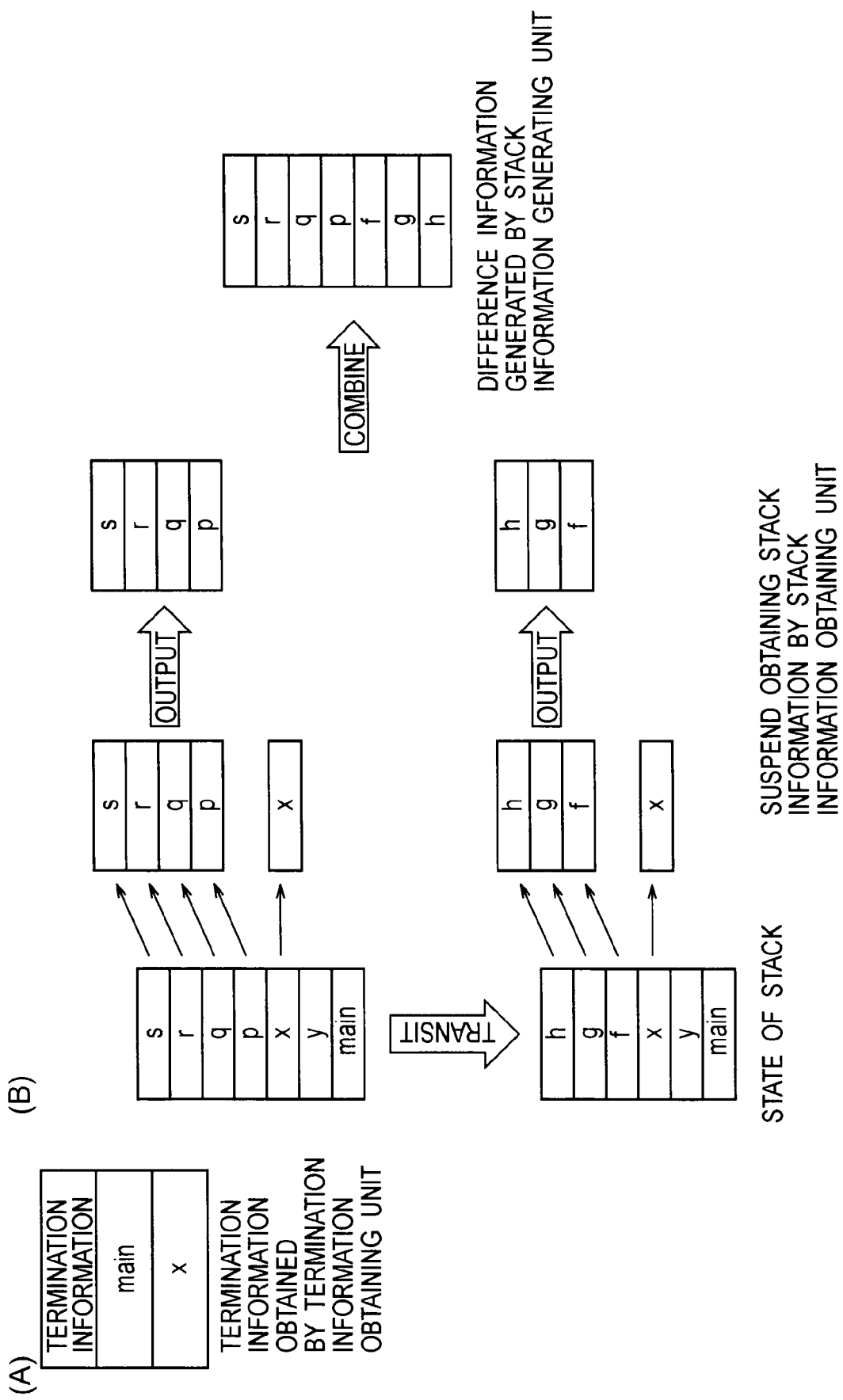
FIG. 10 shows examples in which the obtaining of stack information is suspended by using termination information according to the first embodiment.

FIG. 10 shows an example in which the obtaining of stack information is suspended by using the termination information. FIG. 10(A) shows an example of the termination information obtained by the termination information obtaining unit 550. FIG. 10(B) shows an example of a state of a call stack at a certain point of time. Here, a consideration is given for a case in which a system call is issued, and the state of the call stack shown above in FIG. 10(B) shifts to another state shown below in FIG. 10(B). Although the state of the call stack includes not only addresses but also arguments to be passed to functions, and the like, only the return addresses are shown for the sake of simplifying the description. In the state of the call stack shown above in FIG. 10(B), the stack information obtaining unit 520 sequentially obtains addresses from the top of the stack. Here, when the stack information obtaining unit 520 obtains the addresses and compares the obtained addresses with the termination information, x that is identical with the termination information can be detected. At this time, the stack information obtaining unit 520 suspends obtaining the return addresses, and outputs, as the stack information, the return address having been recorded (s, r, q, p in FIG. 10(B)). In the same manner, the stack information obtaining unit 520 obtains x that is identical with the termination information, from the state of the call stack shown below in FIG. 10(B). Here, the stack information obtaining unit 520 suspends obtaining the return addresses. Thereafter, the stack information obtaining unit 520 outputs, as the stack information, the return addresses having been recorded (h, g, f in FIG. 10(B)). These stack information obtained in this manner are combined with one another by the stack difference information generating unit 530 in the next step. The combined stack information is the stack difference information (right hand side in FIG. 11(B)).

Figure 11:
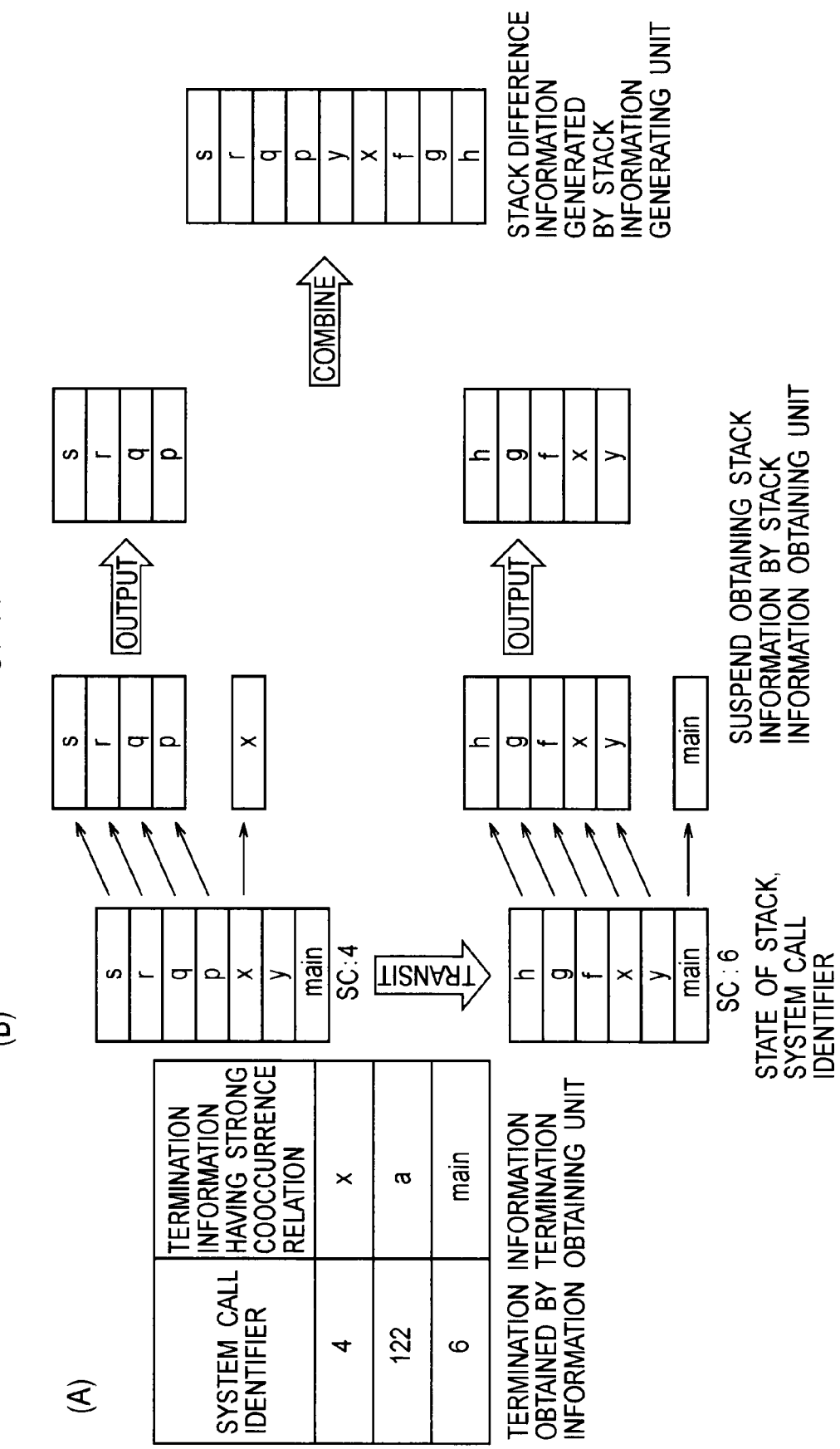
FIG. 11 shows examples in which the obtaining of stack information is suspended by using termination information according to the first embodiment.

FIG. 11 shows another example in which the obtaining of stack information is suspended by using the termination information. FIG. 11(A) shows an example of termination information obtained by the termination information obtaining unit 550. Unlike FIG. 10, the termination information is paired with system call identifiers. The stack information obtaining unit 520 switches termination information in response to a system call, by using a system call number obtained by the system call information obtaining unit 510. FIG. 11(B) shows an example of the state of a call stack at a certain point of time. Here, a consideration is given for a case in which a system call is issued, and the state of the call stack shown above in FIG. 11(B) changes to another state shown below in FIG. 11(B). Although the state of the call stack includes not only addresses but also arguments to be passed to functions, and the like, only the return addresses are illustrated for the sake of simplifying the description. In FIG. 11(B), the state of the call stack is information obtained through the issuance of the system call number 4, the termination information is x. The stack information obtaining unit 520 sequentially obtains return addresses from the top of the stack, and compares the obtained return addresses with the termination information. At the time when the stack information obtaining unit 520 detects a return address that is identical with the termination information x, the stack information obtaining unit 520 suspends obtaining the return addresses, and outputs, as the stack information, the return addresses having been recorded (s, r, p, q in FIG. 11(B)). In the same manner, since the state of the call stack shown below in FIG. 11(B) is information obtained through the issuance of the system call number 6, the termination information is main. The stack information obtaining unit 520 sequentially obtains return addresses from the top of the stack, and compares the obtained return addresses with the termination information. At the time when the stack information obtaining unit 520 detects a return address that is identical with the termination information main, the stack information obtaining unit 520 suspends obtaining the return addresses, and outputs, as stack information, the return addresses having been recorded (h, g, f, x, y in FIG. 11(B)). These stack information obtained in this manner are combined with one another by the stack difference information generating unit 530 in the next step. The combined stack information is the stack difference information (right hand side in FIG. 11(B)).

The stack difference information generating unit 530 receives stack information 525 and system call information 515B, and generates stack difference information 535. The stack difference information generating unit 530 extracts, non-identical portions between the (i−1)-th stack information and the i-th stack information, and generates the stack difference information by combining the non-identical portions thus obtained with one another.

Here, it is assumed that a function model represents anbehavior model that indicates a co-occurrence relation between the function call and an issuance of an arbitrary function return, executed between specific events issued by the software to be monitored. In that case, the model obtaining unit 560 obtains the function model for each system call issued by the monitoring target process 10.

The behavior monitoring unit 540 determines the difference between the stack difference information 535 generated by the stack difference information generating unit 530, and the behavior model obtained by the model obtaining unit 560. Then, the behavior monitoring unit 540 outputs the result of the determination as a determination result 60.

(Software Behavior Monitoring Method)

Figure 12:
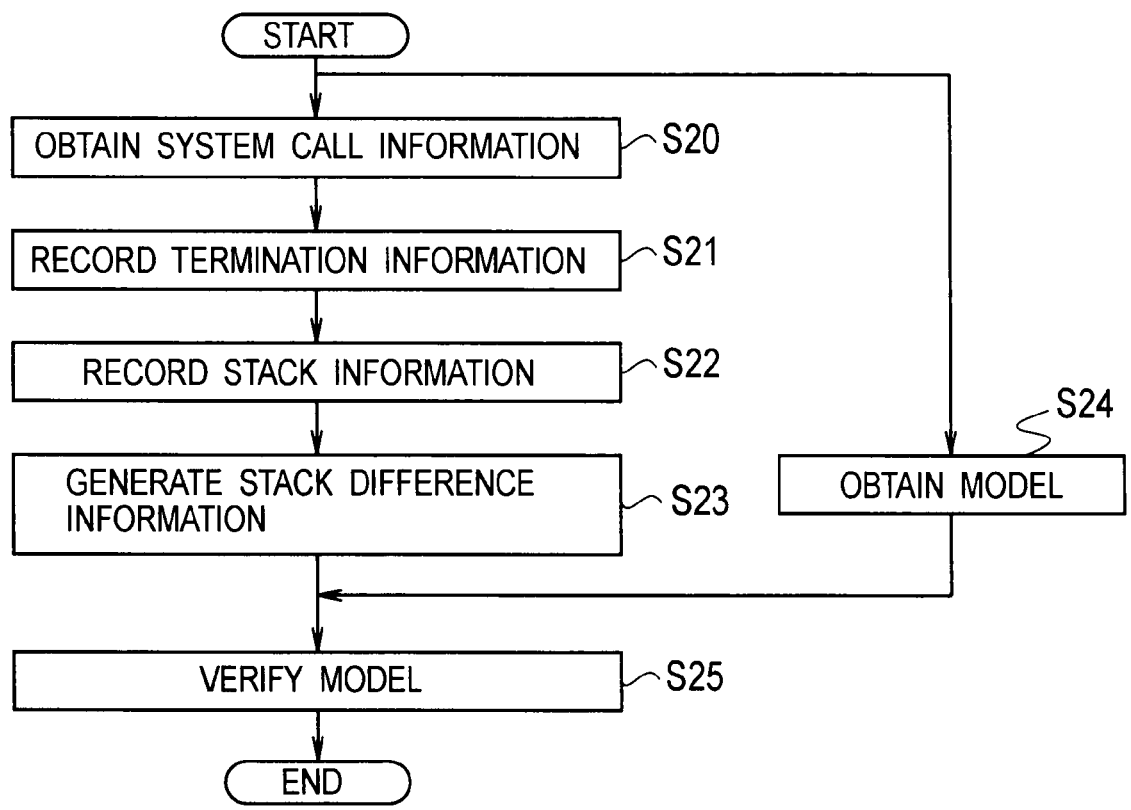
FIG. 12 is a flowchart showing a software behavior monitoring method according to the first embodiment.

Next, a software behavior monitoring method of the first embodiment will be described with reference to FIG. 12.

The system call information obtaining unit 510 detects a system call 15 issued by the monitoring target process 10, and causes the monitoring target process 10 to be in a waiting state from the point of time when the system call 15 is detected until the stack information obtaining unit 520 terminates obtaining the stack information. Moreover, the system call information obtaining unit 510 obtains the system call information from the system call 15 (Step S20).

The termination information obtaining unit 550 obtains termination information 555 suitable for the monitoring target process, from the software identifier 70 and the termination information 40. Then, the termination information obtaining unit 550 transmits the termination information 555 to the stack information obtaining unit 520 (Step S21).

Subsequently, the stack information obtaining unit 520 obtains the call stack state 25 from the memory space 20 used by the monitoring target process. Further, the stack information obtaining unit 520 obtains the stack information 525 by using the termination information 555 (Step S22). Incidentally, an example of operations of the stack information obtaining unit 520 will be described in detail later.

Next, the stack difference information generating unit 530 receives the stack information 525 and the system call information 515B, and generates stack difference information 335 (Step S23).

Meanwhile, once the software is loaded, the model obtaining unit 560 obtains a model 565 suitable for the monitoring of the monitoring target process 10, from the software identifier 70 and the model information 50 (Step S24).

The behavior monitoring unit 540 determines the difference between the stack difference information 535 generated by the stack difference information generating unit 530, and an behavior model obtained by the model obtaining unit 560, and outputs the result of the determination as a determination result 60. (Step S25).

Figure 13:
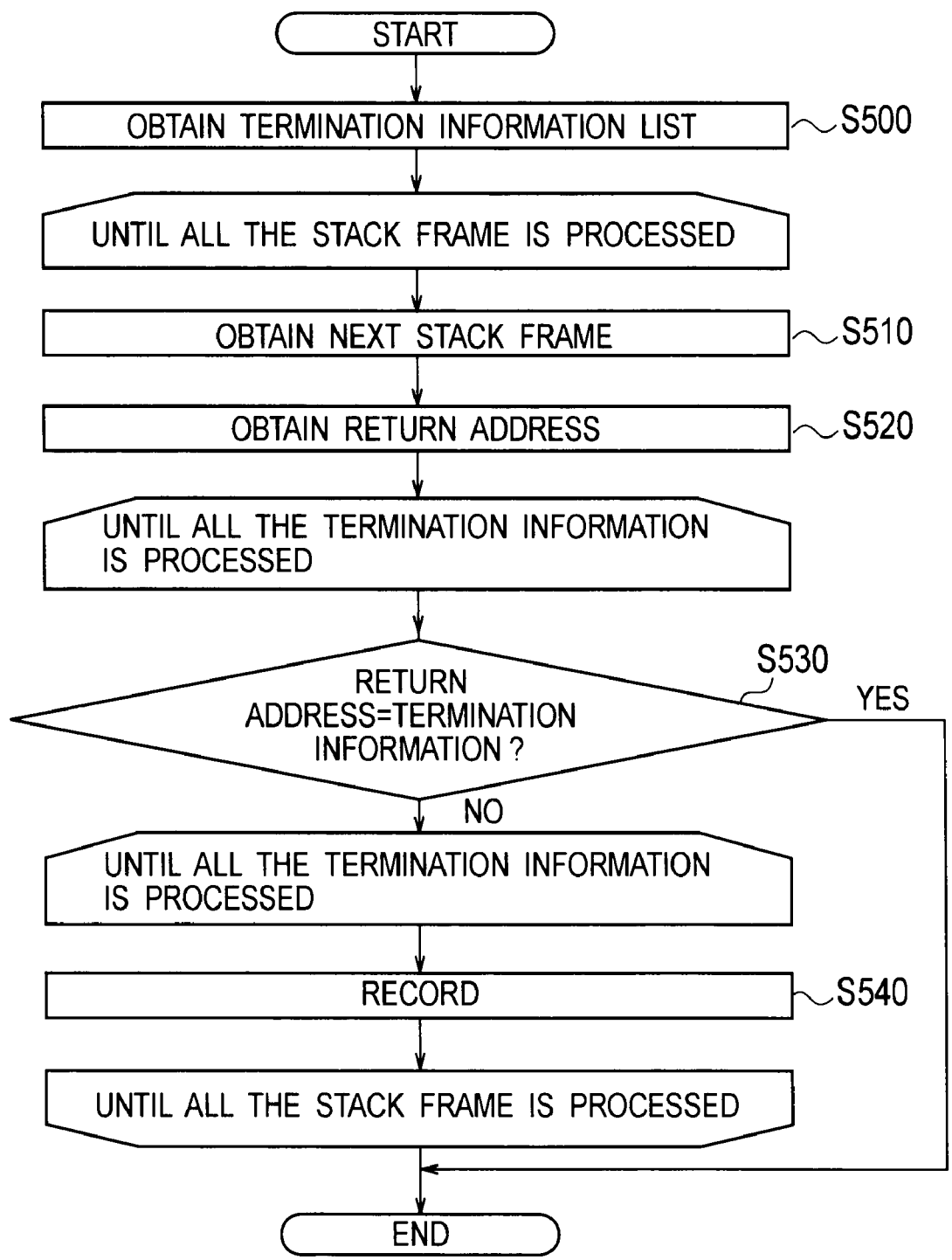
FIG. 13 is a flowchart showing the details of S22 of FIG. 12.

Next, an example of operations of Step S22 will be described in detail with reference to FIG. 13.

First, the stack information obtaining unit 520 obtains termination information form the termination information obtaining unit 550 (Step S500). Then, the stack information obtaining unit 520 sequentially obtains stack frames from the call stack state 25 (Step S500). Moreover, the stack information obtaining unit 520 obtains return addresses of the corresponding stack frames (Step S520).

Next, the stack information obtaining unit 520 sequentially reads the termination information, and compares the return addresses obtained in Step S520 with the termination information (Step S530). The stack information obtaining unit 520 repeats the Step S530 until all of the termination information is processed, or until the return address and the termination information are confirmed as identical. When the stack information obtaining unit 520 does not confirm that return address and the termination information are identical until all of the termination information is processed, the stack information obtaining unit 520 records the return addresses as the stack information (Step S540). Then, the stack information obtaining unit 520 repeats the processes of Steps S510 to S540 until all the stack frames are processed.

When the stack information obtaining unit 520 confirms the return address and the termination information are identical, in Step S530, the stack information obtaining unit 520 suspends the process of the loop, and terminates the process of obtaining the stack information. Incidentally, when error information is added to the termination information, a step of obtaining the return address for the portion indicated by the difference information may be added, after the stack information obtaining unit 520 confirms the return address and the termination information are identical in Step S530.

(Operation and Effect)

The software behavior modeling apparatus of the first embodiment extracts recorded termination information, and generates a software behavior model from stack information based on the termination information.

Accordingly, in the software behavior modeling apparatus of the first embodiment, it is possible to record the termination information for each of the software. The termination information is information for setting a portion where the searching of a call stack is suspended in monitoring, to be a position (in some cases, a vicinity of the position) of original termination information. In addition, it is possible to generate a model that can be used even in a case where the searching of a call stack is suspended by using the termination information for monitoring.

Particularly, by recording the termination information having a strong co-occurrence relation with a specific event (a system call or the like), the termination information specialized for each specific event can be used in monitoring.

In addition, by recording the stack frame information that is located at a certain position viewed from the bottom of the call stack for an arbitrary time period, from the time series of stack information recorded by the stack information recording unit, the number of pieces of termination information to be recorded can be decreased while maintaining small difference (a difference in position within a call stack) between the termination information to be recorded and the original termination information.

Moreover, particularly, the stack frame information is the return address. Thus, information for identifying the stack frame can be obtained without correcting the call stack.

Furthermore, in searching the call stack, the software behavior monitoring apparatus of the first embodiment suspends the searching of the call stack at the time when the return address which is identical with the termination information is detected, and verifies the behavior of the software by using the stack information which have been obtained to the point of the time.

For this reason, according to the software behavior monitoring apparatus of the first embodiment, in monitoring the behavior of software to be monitored while executing the software, the searching of the call stack can be suspended by using the termination information obtained in a learning time. As a result, it is possible to reduce overhead for monitoring.

The termination information obtaining unit obtains information having a high co-occurrence frequency with the specific events, together with the identifier of the specific event. Then, the termination information obtaining unit obtains in advance the termination information, by using the identifiers of specific events. Thereby, in confirming the suspension of the searching of a call stack, it is possible to use termination information having a strong co-occurrence relation with a specific event. Accordingly, suspension suitable for the specific event can be performed.

The termination information obtaining unit obtains information that records, as the termination information, the stack frame information that is located at a certain position viewed from the bottom of a call stack for a certain time period, from the time series of the stack information recorded in advance. Accordingly, it is possible to achieve efficiency, for example, by caching a confirmation result of termination information.

(Second Embodiment)
(Software Behavior Modeling and Software Behavior Monitoring Apparatus)

Figure 14:
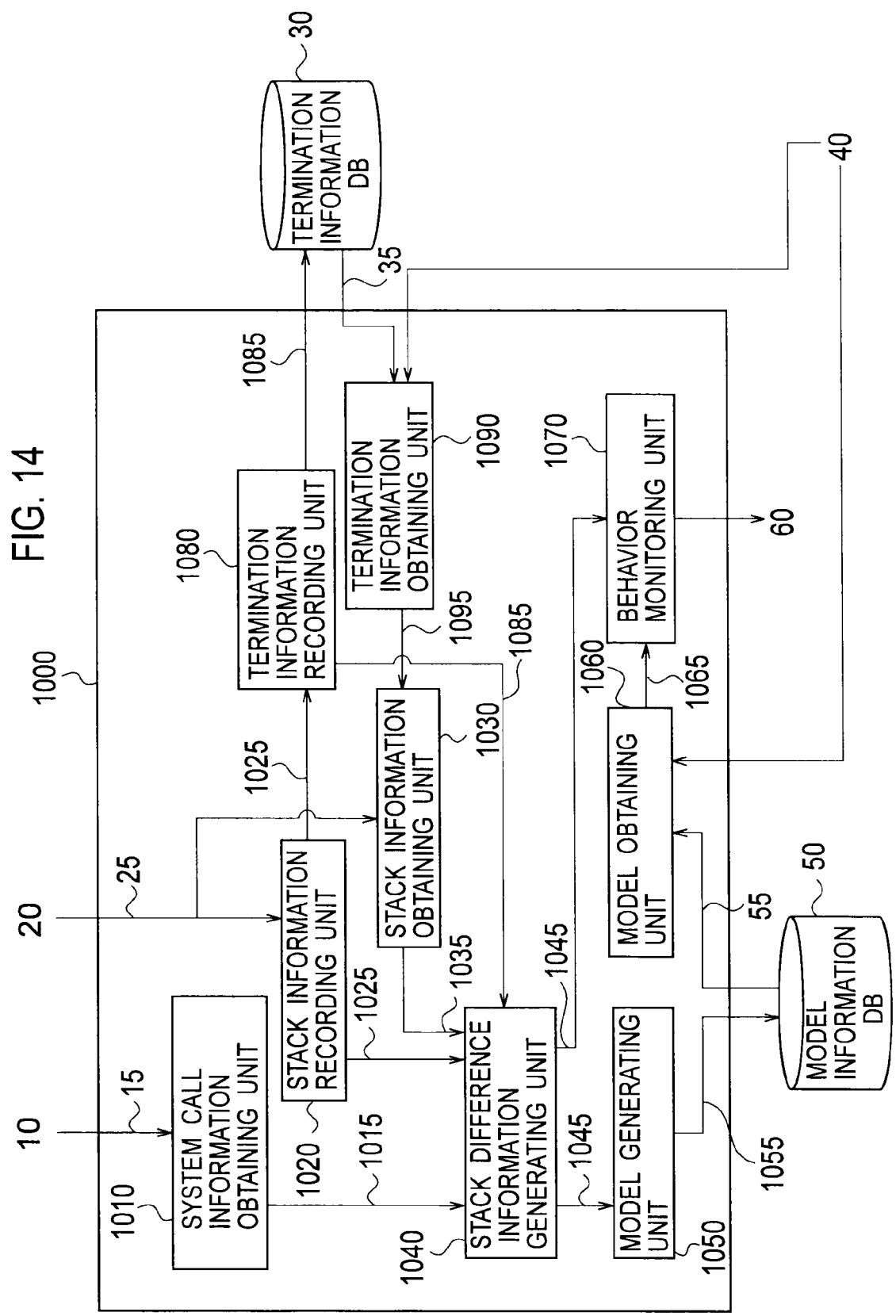
FIG. 14 is a block diagram showing a configuration of a software behavior modeling apparatus and a software behavior monitoring apparatus according to a second embodiment.

FIG. 14 is a block diagram showing a configuration example of a software behavior modeling and software behavior monitoring apparatus 1000 of a second embodiment.

A software behavior modeling and software behavior monitoring apparatus 1000 stores model information 1055, which represents the behavior of a monitoring target process 10, in a model information DB50, and further stores termination information 1085 in a termination information DB30. Further, the software behavior modeling and software behavior monitoring apparatus 1000 obtains model information 55 and termination information 35 that are suitable for monitoring the behavior of the monitoring target process 10, respectively from the model information DB50 and the termination information DB30. Then, the software behavior modeling and software behavior monitoring apparatus 1000 verifies the behavior of the monitoring target process 10, and thereafter outputs a verification result 60.

The software behavior modeling and software behavior monitoring apparatus 1000 includes a system call information obtaining unit 1010, a stack information recording unit 1020, a stack information obtaining unit 1030, a stack difference information generating unit 1040, a model generating unit 1050, a model obtaining unit 1060, an behavior monitoring unit 1070, a termination information recording unit 1080, and a termination information obtaining unit 1090.

When the behavior of the monitoring target process 10 is modeled, the software behavior modeling and software behavior monitoring apparatus 1000 activates the system call information obtaining unit 1010, the stack information recording unit 1020, the stack difference information generating unit 1040, the model generating unit 1050, and the termination information recording unit 1080. Respective constituent elements may be the same as those of the software behavior modeling apparatus 100 of the first embodiment, i.e., the system call information obtaining unit 110, the stack information recording unit 120, the stack difference information generating unit 130, the model generating unit 140, and the termination information recording unit 150, may be used. Details of these elements may be referred to the first embodiment.

When the behavior of the monitoring target process 10 is monitored, the software behavior modeling and software behavior monitoring apparatus 1000 activates the system call information obtaining unit 1010, the stack information obtaining unit 1030, the stack difference information generating unit 1040, the model obtaining unit 1060, the behavior monitoring unit 1070, and the termination information obtaining unit 1090. Respective constituent elements may be the same as those of the software behavior monitoring apparatus 500 of the first embodiment, i.e., the system call information obtaining unit 510, the stack information obtaining unit 520, the stack difference information generating unit 530, the model obtaining unit 560, the behavior monitoring unit 540, and termination information obtaining unit 550, may be used. Details of these elements may be referred to the first embodiment.

(Operation and Effect)

According to the software behavior modeling and software behavior monitoring apparatus 1000 of the second embodiment, in addition to the realization of modeling and monitoring on the same equipment, highly efficient searching of a call stack by using termination information, can be achieved.

(Third Embodiment)

Figure 15:
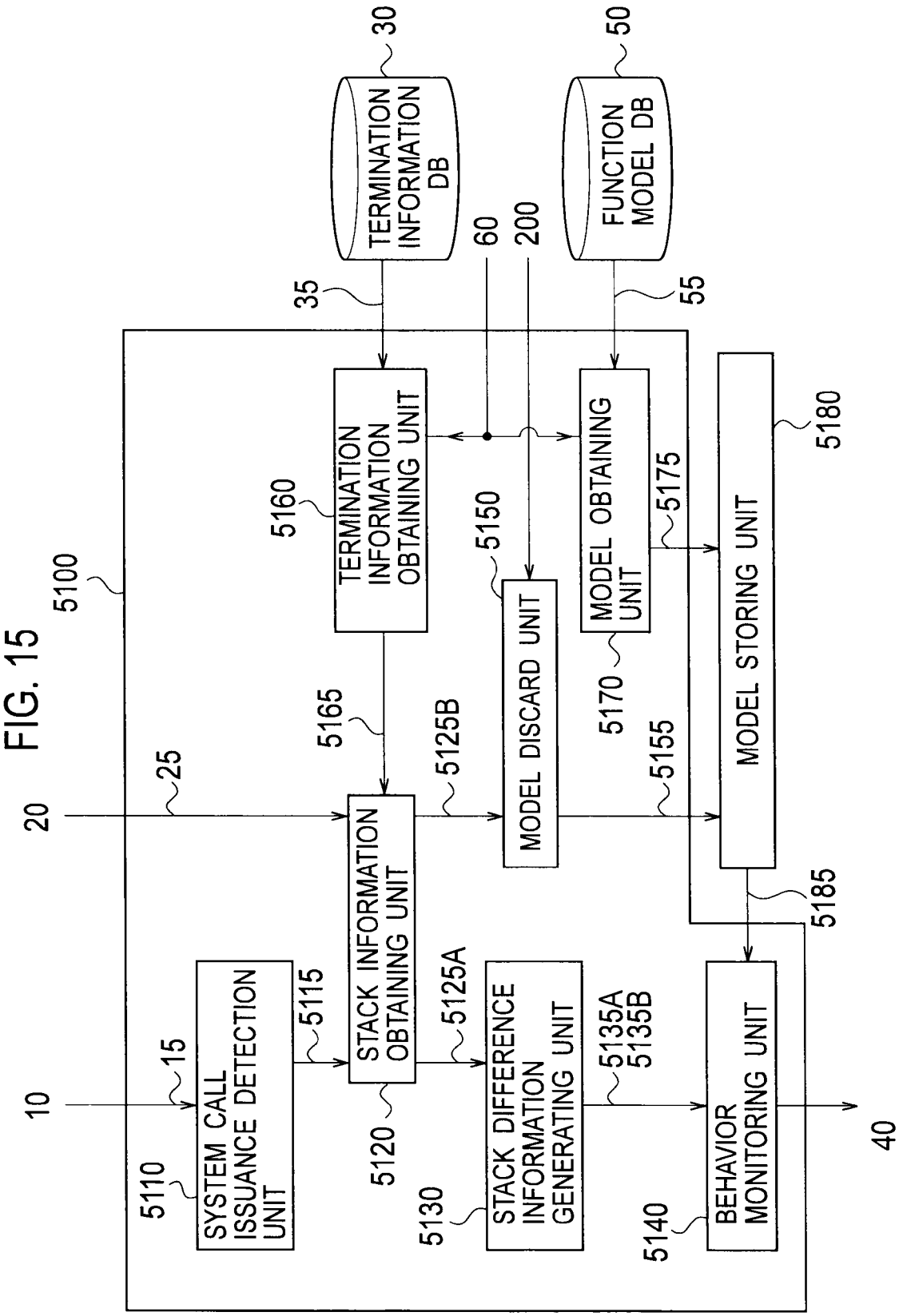
FIG. 15 is a block diagram showing a configuration of a software behavior monitoring apparatus according to a third embodiment.

FIG. 15 is a block diagram showing a configuration example of a software behavior monitoring apparatus 5100 of a second embodiment.

A software behavior monitoring apparatus 5100 is connected to a model storing unit 5180 in which a function model is stored for a certain time period, a termination information DB30 in which termination information is stored, and a function model DB50 in which a function model is stored. The software behavior monitoring apparatus 5100 determines normal/abnormal of the behavior of the monitoring target process 10. Moreover, the software behavior monitoring apparatus 5100 outputs a determination result 40 by using a memory space 20 used by a monitoring target process, a software identifier 60, termination information 35 and a function model 55. Furthermore, the software behavior monitoring apparatus 5100 records a function model 5175 in the model storing unit 5180, obtains a function model 5185 recorded in the model storing unit 5180, and outputs a discard instruction 5155 so that a function model recorded in the model storing unit 5180 is deleted from the model storing unit 5180.

The software behavior monitoring apparatus 5100 includes a system call issuance detection unit 5110, a stack information obtaining unit 5120, a stack difference information generating unit 5130, a behavior monitoring unit 5140, a model discard unit 5150, a termination information obtaining unit 5160, and a model obtaining unit 5170.

The system call issuance detection unit 5110 detects that the monitoring target process 10 issues a system call 15, suspends the monitoring target process 10 until the verification of the behavior is completed. Then, the system call issuance detection unit transmits the detection information 5115 to the stack information obtaining unit 5120. Since the detection information 5115 may only be used as a trigger to activate the stack information obtaining unit 5120, for example, supposing that there is a flag for controlling the behavior of the stack information obtaining unit 5120, the bit of the flag may be set on. The system call issuance detection unit 5110 can be easily realized, for example, by using ptrace that is a debag tool on Linux.

When the stack information obtaining unit 5120 receives the detection information 5115, the stack information obtaining unit 5120 obtains the call stack state 25 from the memory space 20 used by the monitoring target process, and further generates stack information 5125A by using termination information 5165. The stack information 5125A thus generated is transmitted to the stack difference information generating unit 5130. The stack information obtaining unit 5120 searches the call stack state 25 for stack frames, and sequentially obtains stack frame information for identifying stack frames. The stack frame information is, for example, a return address, a canary or the like.

In the third embodiment, a description will be given in detail for an example in which stack frames are identified by using the return addresses. That is, the stack information obtaining unit 5120 sequentially obtains return addresses existing respectively in frames from the call stack state 25. Various ways may be employed for the extraction. In a call stack such as x86 or ARM, a return address locates at the uppermost level (opposite to the bottom) of the stack frame. For this reason, by using a stack pointer and a base pointer retained in a register, a value immediately below the base pointer is obtained. Thereby, the extraction can be achieved. Stack information is recorded in time series by the stack information recording unit 5120, at the timing of the issuance of each system call. In addition, the stack information obtaining unit 5120 suspends obtaining the return addresses by using termination information 5165 (described later), and then transmits termination arrival information 5125B to the model discard unit 5150.

The stack difference information generating unit 5130 receives the stack information 5125A, and generates the stack difference information, that is, pop information 5135A and push information 5135B. The stack difference information generating unit 5130 extracts the non-identical portions between the (i−1)-th stack information and the i-th stack information of the system call, and then outputs the non-identical portions thus obtained, as pop information and push information.

The termination information obtaining unit 5160 sequentially compares, from the bottom of a call stack, (i−1)-th stack information with i-th stack information both recorded by the termination information DB30. Here, the termination information obtaining unit 5160 records termination information that is a stack frame information indicating a boundary between an identical portion and a non-identical portion, where the identical portion indicates a portion where the (i−1)-th stack information and i-th stack information are identical in terms of a position of the call stack and the stack frame information, and the non-identical portion indicates a portion following a stack frame where the stack frame information is detected as being different between the (i−1)-th stack information and the i-th stack information. Then, the termination information obtaining unit 5160 creates a boundary between the identical portion and the non-identical portion. FIG. 2 shows examples of stack information, an identical portion, a non-identical portion, stack difference information and termination information, respectively. When (i−1)-th stack information is compared with i-th stack information as shown in FIG. 2(A), an identical portion is as shown in FIG. 2(B), and non-identical portions are as shown in FIG. 2(C). Since the return address that divides the identical portion and the non-identical portion is "x," the termination information is x as shown in FIG. 2(E). In addition, stack difference information used in modeling is information formed by combining the non-identical portions. When the stack difference information is generated, the following process is performed. Specifically, identical portions are first removed from stack information. Then, non-identical portions are extracted. In this case, it is necessary to sequentially verify stack information from the bottom. However, search for a call stack is sequentially performed from the upper level of the stack to the bottom thereof, since a stack pointer is located at the upper level (opposite to the bottom). For this reason, it can be said that all the return addresses stacked in the call stack are required to be obtained. However, the termination information is located on the boundary between "information to be removed" and "information to be extracted." Accordingly, by listing in advance the termination information, and by then using the listed termination information at the time of searching the call stack, it is possible to suspend the process without obtaining all the return addresses.

Figure 16:
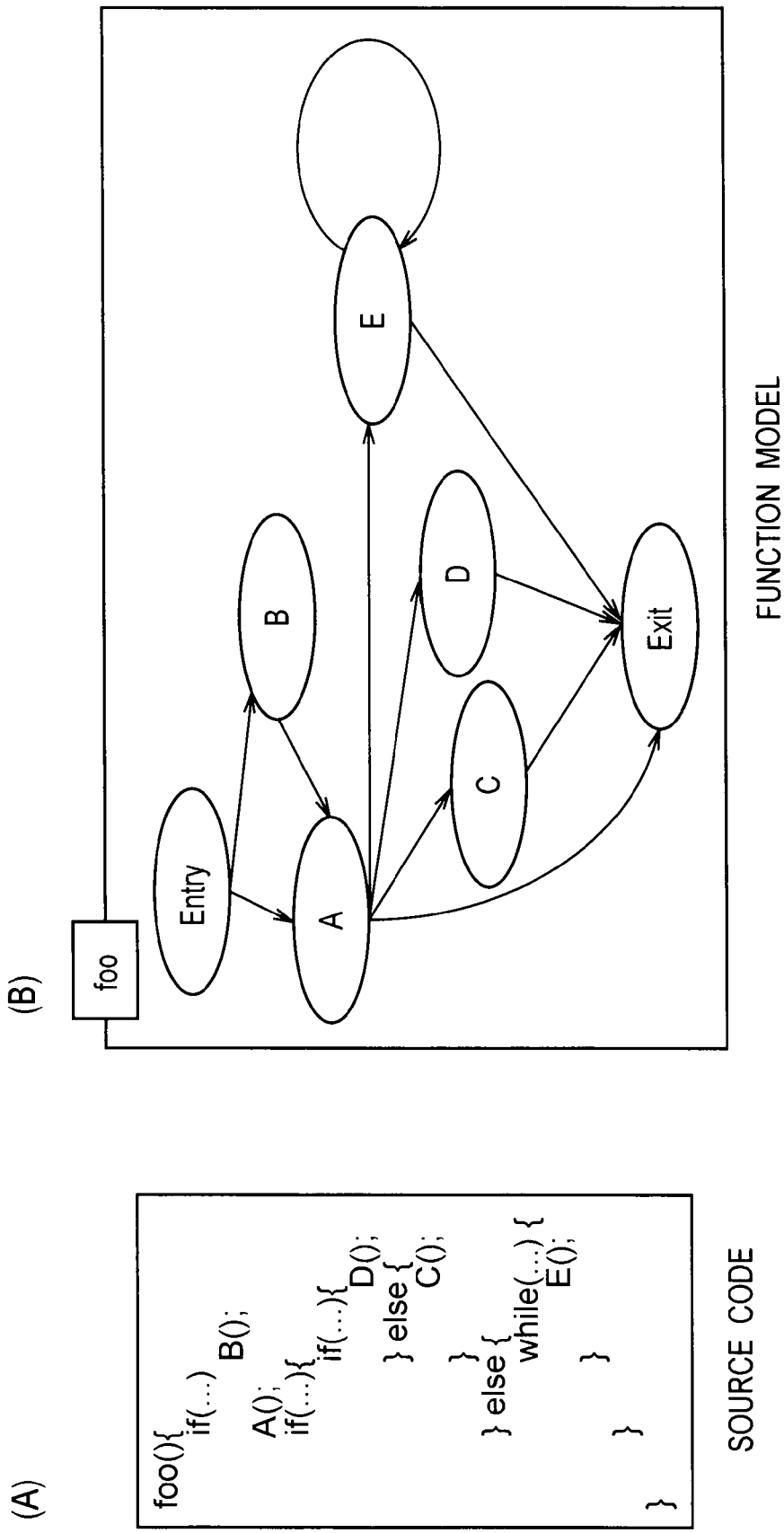
FIG. 16 shows examples of function model according to the third embodiment.

FIG. 16 shows an example of a function model. A function model according to the third embodiment is an automaton generated by extracting a relation of function call from a source code. A function model is existed for each function. A node is defined as one of (of (1) entry of function, (2) exit of function, and (3) name of the function. In the function as an automaton, a line incoming a node is defined as a function call, and a line outgoing from a node is defined as a function return. FIG. 16(A) shows an example of a source code, and FIG. 16(B) shows an example of a function model generated by analyzing the source code.

Figure 17:
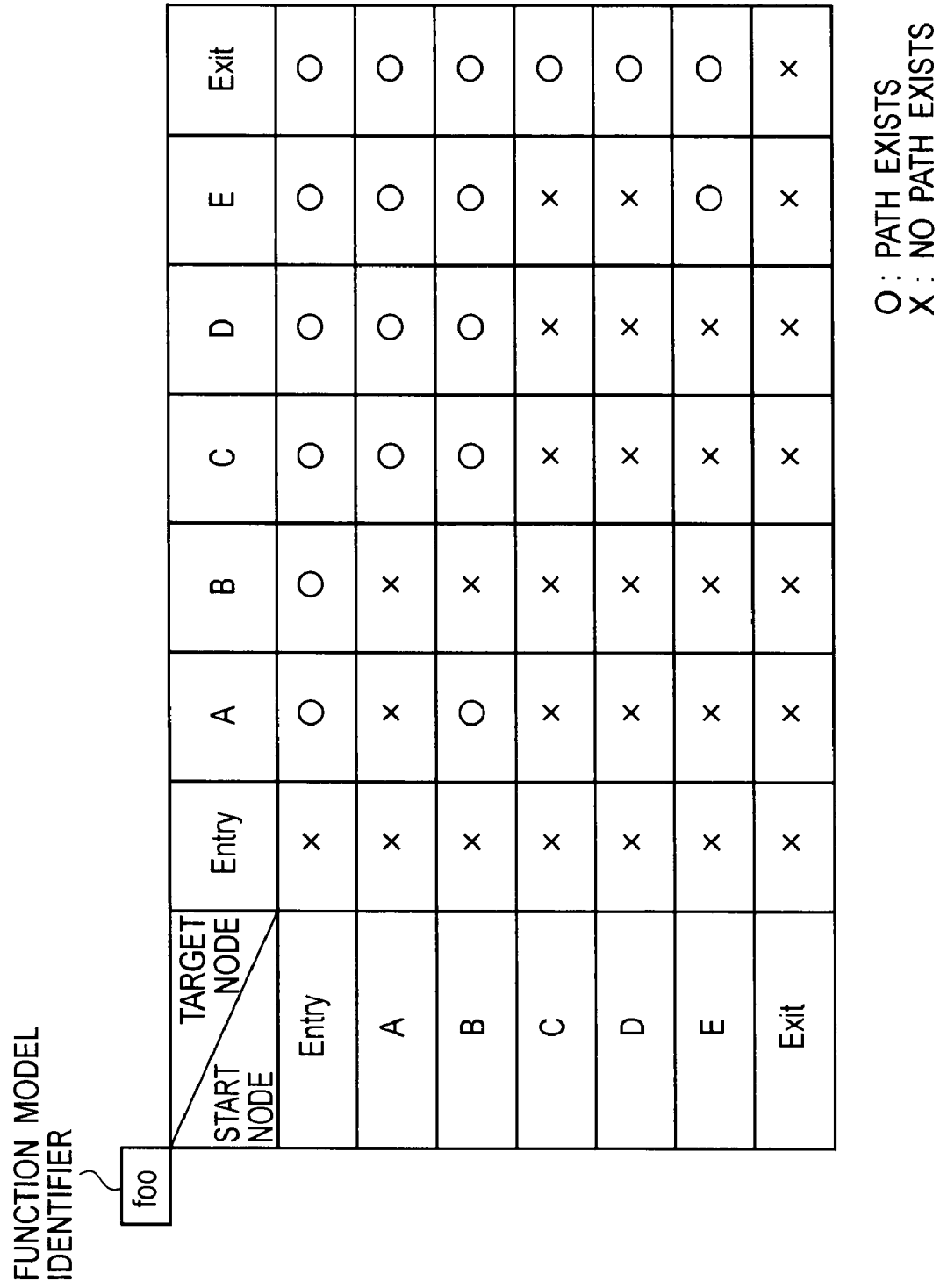
FIG. 17 shows examples of function model according to the third embodiment.

Incidentally, any form of a function model can be used as long as push and pop functions can be verified, and is not necessarily an automaton. For example, when one node is set as a start point, and another node is set as a target point, among all the nodes in an automaton, a table may be used for representing a result of analysis that determines whether or not a path between the start point and the target point is existed. FIG. 17 shows an example of a function model, which is generated from a source code shown in FIG. 16(A), and which is represented with a table. Each symbol "O" represents that a path exists, and each symbol "X" represents that a path does not exist.

Figure 18:
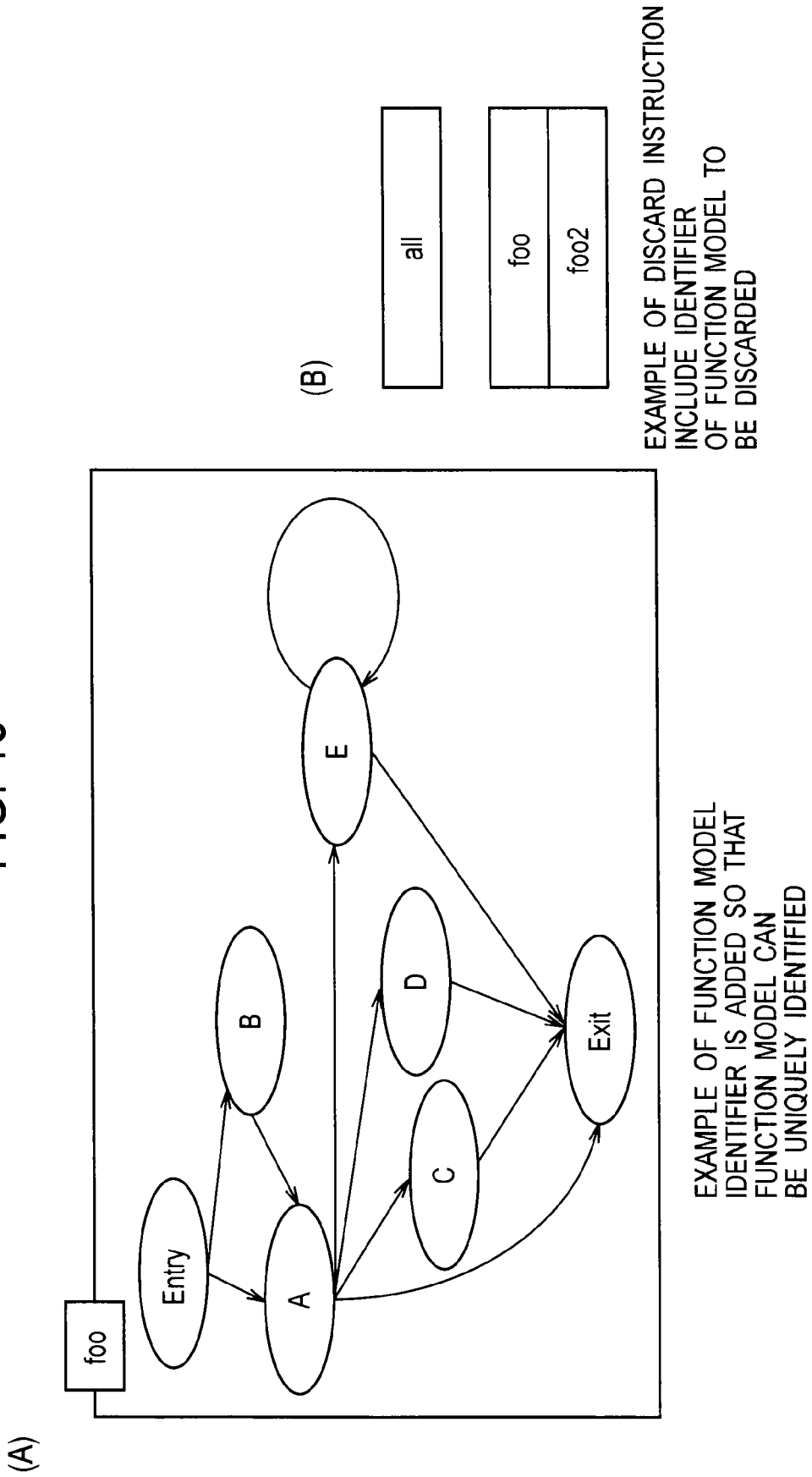
FIG. 18 shows examples of a function model and a discard instruction according to the third embodiment.

The model obtaining unit 5170 obtains, from the function model DB50, a function model suitable for verifying the behavior of the monitoring target process 10, and then records the obtained function model in the model storing unit 5180. As will be described later, the behavior monitoring unit 5140 demands a function model suitable for verification for each of frames of pop information and push information. For this reason, the behavior monitoring unit 5140 obtains a function model from the function model DB50 when a desired function model does not exist in the model storing unit 5180. In addition, when the model storing unit 5180 has a large capacity, efficient behavior monitoring can be achieved by managing with an LRU algorithm and the like. However, in a built-in device such as a cellular telephone or the like, the memory capacity serving as the model storing unit is limited. Accordingly, it is important to achieve the management of a model with a small capacity. In addition, when a function model is recorded in the model storing unit 5180, an identifier may be added to the function model. Although described later, a function model recorded in the model storing unit 5180 may possibly be discarded by the model discard unit 5150. At this time, an identifier may be added to the function model so that the function model to be discarded can be identified. FIG. 18(A) shows an example of a function model to which an identifier is added. In this example, a function name "foo" is added to an automaton that is a function model.

The behavior monitoring unit 5140 receives pop information 5135A and push information 5135B both generated by the stack difference information generating unit 5130, and also receives a function model 5185 recorded in the model storing unit. Then, the behavior monitoring unit 5140 determines whether or not a difference between the pop information and the function model, and the difference between the push information and the function model exists.

Figure 19:
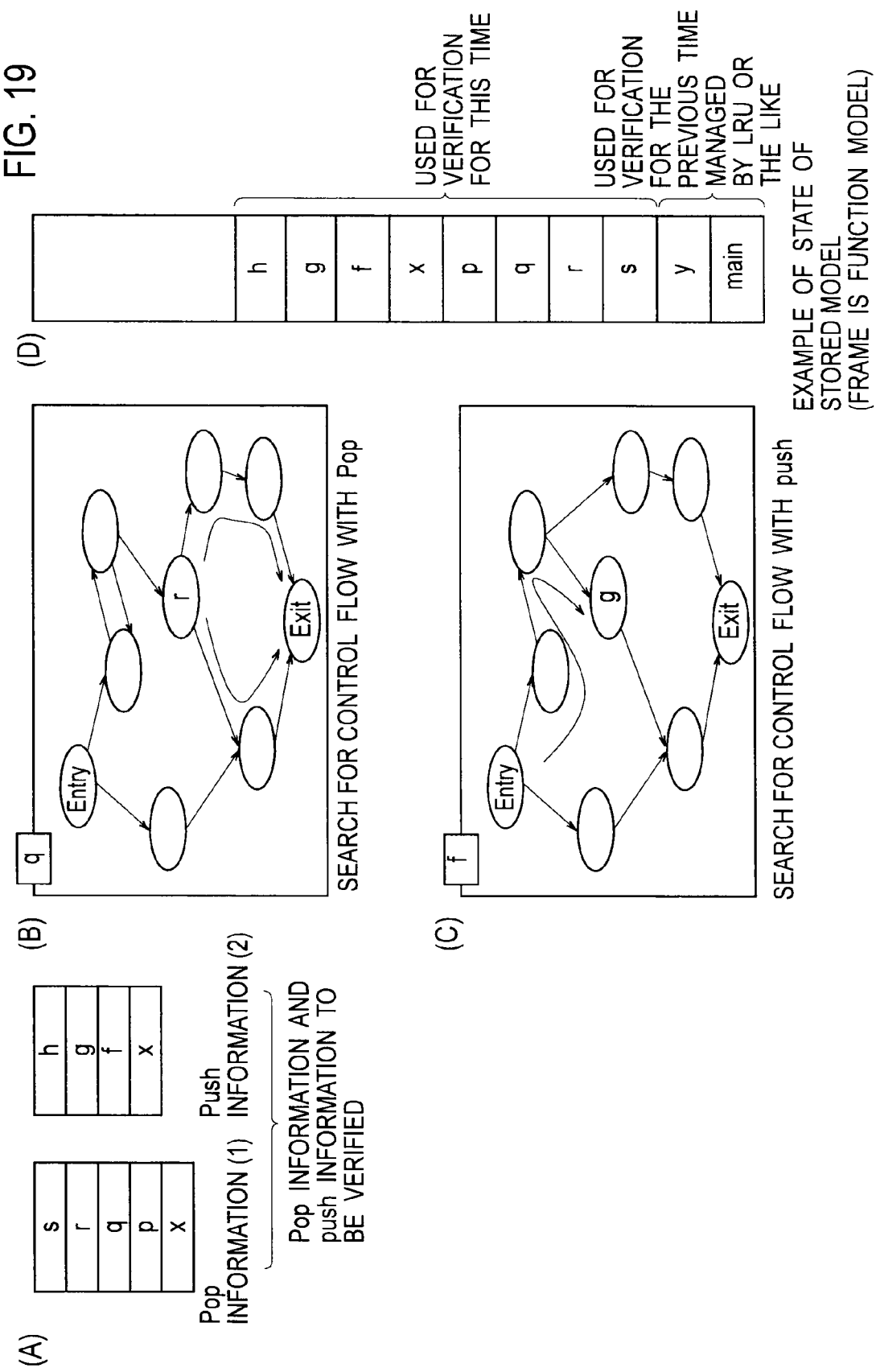
FIG. 19 shows examples of behavior monitoring using the function model according to the third embodiment.

FIG. 19 shows an example of the operation of the behavior monitoring unit 5140. Once the behavior monitoring unit 5140 receives pop information and push information (FIG. 19(A)) both of which are targets for verification, the behavior monitoring unit 5140 verifies whether or not there is, on a function model, a control flow that can realize the state of a call stack represented by the pop information and the push information. For example, with respect to "q" of the pop information ((1) in FIG. 19(A)), the behavior monitoring unit 5140 verifies whether or not q can be terminated after returning from r. FIG. 19(B) shows a function model for q. Here, the behavior monitoring unit 5140 verifies whether or not a path from the node r to Exit exists. As shown in FIG. 19(B), when a path from r to Exit exists in the function model for q, a verification result on q is concluded as normal. Meanwhile, when the path from r to Exit does not exist, a verification result is concluded as abnormal. In this manner, the behavior monitoring unit 5140 performs verification sequentially from s to x. When the behavior of the pop is normal, the behavior monitoring unit 5140 verifies the behavior of push. Here, for example, with respect to "f" of push information ((2) in FIG. 19(A)), the behavior monitoring unit 5140 verifies if it is possible to come into f and to reach g. FIG. 19(C) shows a function model for f. Here, the behavior monitoring unit 5140 verifies whether or not a path from a node Entry to g exists in the next frame. As shown in FIG. 19(C), for the function model for f, a path from Entry to g exists. Accordingly, a verification result on f is concluded as normal. When the path from Entry to g does not exist, a verification result on f is concluded as abnormal. In this manner, for the push information, the behavior monitoring unit 5140 performs verification sequentially from x to h. Only when it is determined that behaviors are normal in all verifications, the behavior monitoring unit 140 outputs the result 40 as normal.

As described above, the behavior monitoring unit 5140 reads desired function models for the respective frames for pop information and push information, and verifies paths. FIG. 19(D) shows a state of the model storing unit 5180 in which push information "h" is verified. However, it is assumed that the management of the model storing unit 5180 follows an LRU algorithm. At this time, in the model storing unit 5180, other than the function models used in the verifications at this time, those used in the previous verifications are also stored.

The termination information obtaining unit 5160 obtains termination information 5165 suitable for the monitoring target process 10 from the identifier 60 and the termination information 35, and then transmits the obtained termination information 5165 to the stack information obtaining unit 5120. The concept of the termination information is as described above. It has been described that a list (a generation of this list is referred to as "a prior learning") of the termination information is referred to return addresses dividing an identical portion and a non-identical portion, and is obtained by executing, in advance, the software to be monitored. Further, it has been described that the termination information is useful as information for suspending the searching of the call stack. Additionally, frames existing below the termination information are identical portions and cannot be verified by the behavior monitoring unit. By utilizing this fact, when the stack obtaining unit detects termination information while searching the call stacks, a model function being used for the previous verification and existing in the model storing unit is deleted so that the remaining capacity of the model storing unit can be increased. Particularly, the termination information that is used by the software behavior monitoring apparatus 5100 can be considered as one which locates at a certain position when viewed from the bottom of the call stack for a time period being longer than a threshold. Here, the threshold may be set, for example, by a user at the time of performing a prior learning. Considering the above, an effect of this configuration can be further pronounced. A function or the like that is represented by the main function and that controls a program (or a module) stays at a certain position in a call stack for a long time period. Accordingly, in many cases, return addresses located below the certain position are identical between the i-th stack information and the (i–1)-th stack information. For this reason, a return address located at a certain position for a long time period is highly likely to be original termination information. Accordingly, the termination information is not necessarily a return address that locate on a boundary of an identical portion and a non-identical portion. Alternatively, a return address that locates at a certain position of a call stack for a long time period may be extracted as termination information.

Figure 20:
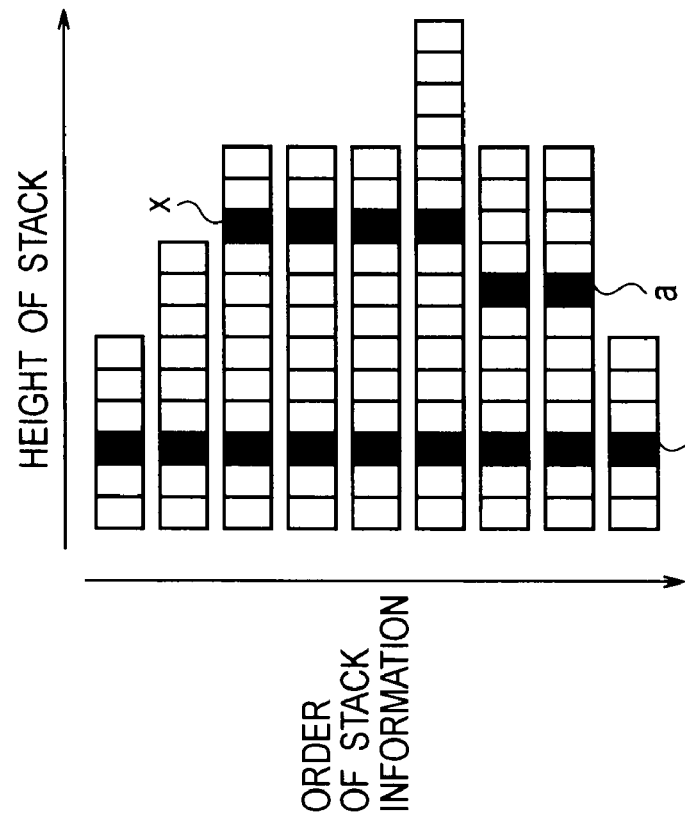
FIG. 20 shows examples of stack information and termination information according to the third embodiment.

FIG. 20 shows an example of time series of stack information obtained by the prior learning. In the stack information, main, x, and a are return addresses which have located respectively at certain positions for a long time period. As described above, return addresses, which have been once used as the termination information, and which exist respectively at certain positions for a long period, are extracted as the termination information. Such termination information obtained in that way may not always exist on a position that divides an identical portion and a non-identical portion. However, frames existing below termination information contain many identical portions. In other words, there is a very small possibility that frames existing below termination information are to be verified. Moreover, since this termination information is a return address which locates at the same call stack position for a certain time period, frames existing below and in the direction toward the bottom are put in a state for a certain period, in which the frames are out of verification targets. Considering all the above, it can be concluded that the deleting of function models of frames existing below termination information from the model storing unit does not lead to any big problem.

Figure 21:
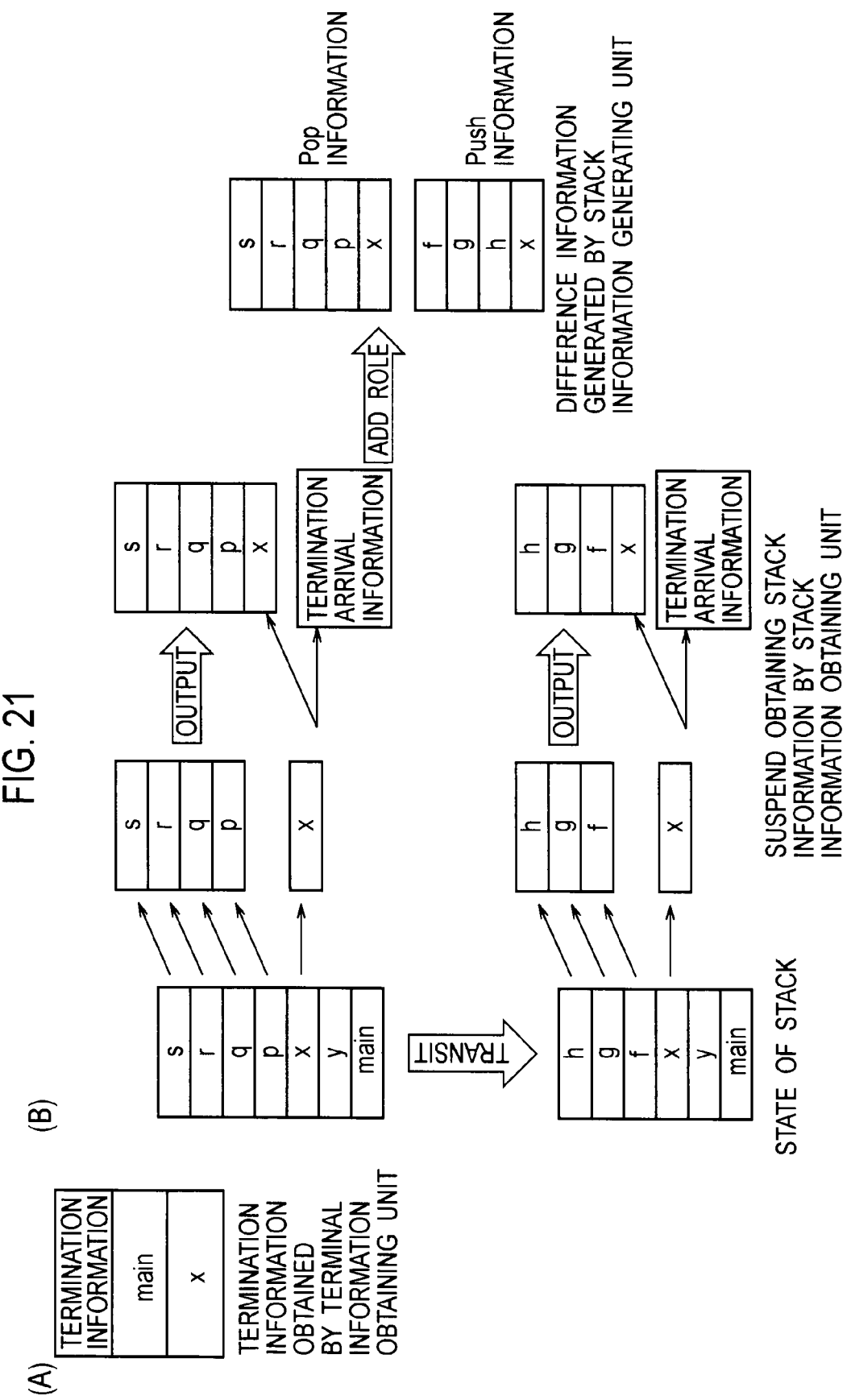
FIG. 21 shows examples in which the obtaining of stack information is suspended by using termination information according to the third embodiment.

FIG. 21 shows an example, in which the obtaining of stack information is suspended by using termination information, and in which termination arrival information is then outputted. FIG. 21(A) shows an example of termination information obtained by the termination information obtaining unit 5160. FIG. 21(B) shows an example of the state of a call stack at a certain point of time. Here, a consideration is given for an example in which a system call is issued, and a difference occurs from a state of a call stack shown above in FIG. 21(B) to a state shown below in FIG. 21(B). Although the state of the call stack includes not only addresses but also arguments to be passed to functions, and the like, only the return addresses are illustrated for the sake of simplifying the descriptions. In the state of the call stack shown above in FIG. 21(B), addresses are sequentially obtained from the top of the stack. When comparing these addresses with the termination information while continuing an obtaining process, x that agrees with the termination information is detected. At this time, the obtaining of return addresses is suspended, and return addresses having been recorded are outputted as stack information including x, and termination arrival information is outputted (s, r, q, p, and x in FIG. 21(B)). Also in the same manner as above for the state of the call stack shown below in FIG. 21(B), termination arrival information is outputted. Specifically, at the time when x that is identical with the termination information is detected, the obtaining of return addresses is suspended. Then, return addresses having been recorded are outputted as stack information including x. Thereafter, the termination arrival information is outputted (h, g, f, and x in FIG. 21b). These pieces of the stack information obtained in this manner are caused to become stack difference information (pop information, push information) by the stack difference information generating unit 5130 in the next step to be stack difference information (right hand side of FIG. 21B).

Upon receipt of the termination arrival information, the model discard unit 5160 will output an instruction (a discard instruction 5155) for deleting a function model stored in the model storing unit 5180 and delete the function model. Function models to be deleted may be all of the function models existing in the model storing unit 5180. Alternatively, for example, function models that are determined not to be used so fluently by temporarily changing a threshold in an LRU algorithm may be selected to be deleted. It may be set in a designing stage the way to determine which function models are to be deleted. Moreover, it may be inputted from the outside by using a policy document, for example. Incidentally, after obtaining an amount 200 of memory currently used, whether or not to output a discard instruction may be switched depending on the amount of memory used. In addition, when an identifier is added to a function model, by including the identifier of the function model to be discarded into the discard instruction 5155, a discard target can be specified. FIG. 18(B) shows an example of the discard instruction 5155. FIG. 18(B) below shows an example in which identifiers "foo" and "foo2" of function models to be discarded are transmitted to a discard instruction. FIG. 18(B) above shows an example in which "all" meaning that all function models are to be discarded is transmitted. "foo" and "foo2" may take hash values. At that time, "all" may take values which do no collide with identifiers of function models.

FIG. 22 shows an example of discard of a function model by a model discard unit. Here, deletion targets are all the function models existing in a model storing unit. FIG. 22(A) shows an example of an output from a stack information obtaining unit. FIGS. 22(A) (1) and (2) are the (i–1)-th stack information and the i-th stack information. It is assumed that these pieces of stack information have been obtained as a result of an suspension of searching of a call stack at the time when termination information "x" is detected. That is, after termination arrival information is received, a termination arrival flag is set ON (FIG. 22(A)(3)). With the termination arrival flag set ON, the process of the model discard unit in this state causes function models "y" and "main" (FIG. 22(B) left) used for the previous verification to be discarded (FIG. 22(B) center) from the model storing unit. In the subsequent processes, when function models are requested by the behavior monitoring unit, the function models "s" to "h" necessary for verification are stored in the model storing unit by the model obtaining unit (FIG. 22(B) right).

FIG. 23 shows an example of a discard policy used by the model discard unit. The discard policy is a table composed of columns of software identifiers and discard targets, in which a discard target is designated for each piece of software. That is, in the case of software indicated by the software identifier "10," all function models stored in the model storing unit become discard targets. On the other hand, in the case of software of the software identifiers 20 and 30, a threshold of an LRU algorithm is temporarily changed and, thereby, function models that are less frequently used are set to be discarded. The threshold may be determined based on the distribution of frequencies of the respective function calls of software. The distribution of frequencies can be obtained by operating the software in advance. When a locality is not found in the distribution, all function models may be set as discard targets.

(Software Behavior Monitoring Method)

Figure 25:
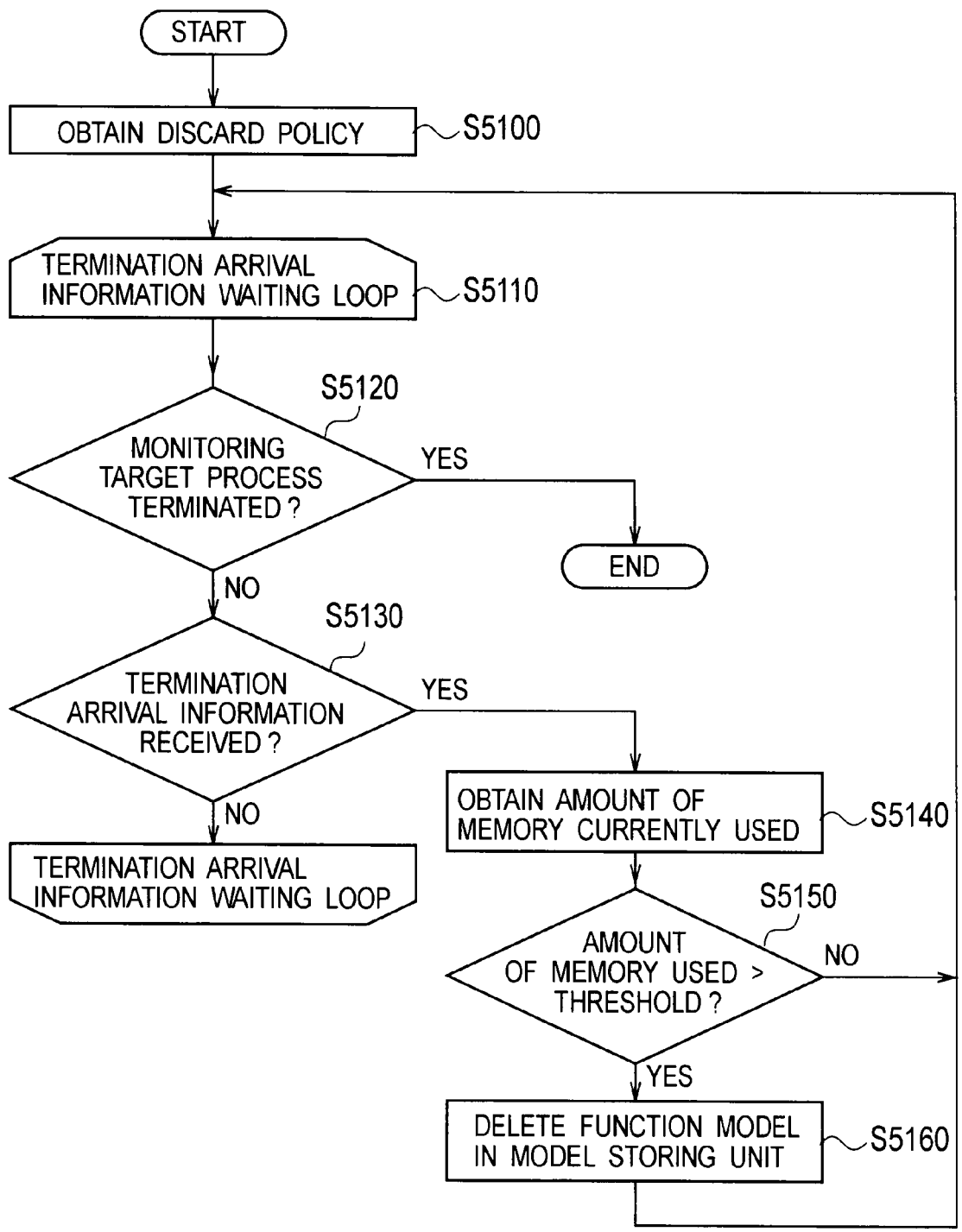
FIG. 25 is flowchart showing a software behavior monitoring method according to the third embodiment.

Next, a software behavior monitoring method of the third embodiment is described with reference to FIGS. 24 and 25.

First, an example of the operation of the stack information obtaining unit 5120 is described with reference to FIG. 24.

First, the stack information obtaining unit 5120 obtains termination information from the termination information obtaining unit 5160 (Step S5500). From the call stack state 25, the stack information obtaining unit 5120 sequentially obtains stack frames (Step S5510), and then the stack information obtaining unit 5120 obtains return addresses of the stack frames (Step S5520).

Next, the stack information obtaining unit 5120 sequentially reads termination information, and compares the return addresses obtained in Step S5520 with the termination information (Step S5530). The stack information obtaining unit 5120 repeats the process of Step S5530 until all of the termination information is processed, or until a return address and the termination information is confirmed as identical. When the return address and the termination information are not confirmed as identical until all the termination information is processed, return addresses are recorded as stack information (Step S5540). Then, the stack information obtaining unit 5120 repeats the processes of and Steps S5510 to S5540 until all of the stack frames are processed. When the return address and the termination information are confirmed as identical in Step S5530, the process exits the loop, and termination arrival information indicating that termination information has been detected is outputted (Step S5550), and the stack information obtaining unit 5120 terminates the process. The termination arrival information indicating that termination information has been detected may be used as a trigger to activate the model discard unit 5150. For example, supposing that there is a flag for controlling the operation activation of the model discard unit 5150, the bit of the flag may be set on.

Next, an example of the operation of the model discard unit 5150 is described with reference to FIG. 25.

When the model discard unit 5150 receives the termination arrival information, the model discard unit 5150 obtains a discard policy for comprehending function models to be detected (Step S5100). Next, the model discard unit 5150 performs verification on whether or not a monitoring target process is completed, and on whether or not the termination arrival information is received (Steps S5120 and S5130, respectively). When both of the above-described events are not detected, the model discard unit 5150 repeats processes of Steps S5110 to S5130.

When the above-described event is detected in Step S5120, the model discard unit 5150 terminates the model discard process. When the above-described event is detected in Step S5130, the model discard unit 5150 obtains the amount of memory currently used (Step S5140), and verifies whether or not the amount of memory used has exceeded a certain threshold (Step S5150). When the amount of memory used has not exceeded the threshold, the process returns to S5110. When the amount of memory used has exceeded the threshold, the function models in the model storing unit are deleted according to the discard policy (Step S5160). Then, the process returns to Step S5110.

In the third embodiment, a description will be given for an example in which a policy is used in the model discard unit 5150 for determining a function model to be deleted. However, when a function model to be deleted is determined in advance, this policy is unnecessary. In this case, process of Step S5100 may be omitted. Moreover, in the third embodiment, it is assumed that the model discard unit 5150 determines whether or not to delete a function model, according to the amount of memory used. However, when the model discard unit 5150 determines whether or not to delete a function model according to the amount of memory used, processes of Steps S5140 to S515 may be omitted.

(Operation and Effect)

Considering the method of Non-patent Document 1, functions indicated by stack frame information that appears after the detection of the termination information are removed from targets to be verified. That is, function models of functions existing on these identical portions does not necessarily exist in the memory. For this reason, while performing a search on a call stack, the software behavior monitoring apparatus according to the third embodiment suspends the search on the call stack once a return address which is identical with termination information is detected. Thereafter the software behavior monitoring apparatus further discards function models stored in a cache.

Hence, according to the software behavior monitoring apparatus of the third embodiment, it is possible to eliminate unnecessary function models from a memory, when monitoring the behavior of software to be monitored during the execution of the software. Accordingly, the space overhead for the entire monitoring device can be reduced while checking the time overhead. Moreover, it is possible to eliminate, from the memory, unnecessary function models that remains in the memory. As a result, the amount of memory to be used can be reduced.

The discarding function models could lead to the discarding of a function model necessary for verifying stack difference information at the time when the next system call occurs. For this reason, the termination information obtaining unit obtains information recording stack frame information that is located at a certain position viewed from the bottom of a call stack for an arbitrary time period, from the series of the stack information recorded in the stack information recording unit. Thereby, only function models having not been used for a certain period of time can be discarded in verifying. As a result, the risk of discarding necessary function models can be reduced at the time of discarding function models by using the termination information In addition, depending on the amount of available memory, the caching of function models by means of an LRU algorithm or the like may lead to a greater possibility that time overhead can be reduced without discarding function models. For this reason, by grasping the amount of memory currently used, the model discard unit performs switching on whether or not to discard function models by using the termination information. Thereby, the model discard unit can discard function models only when necessary. Accordingly, the risk can be reduced.

Moreover, according to the technical feature of the present invention, the stack frame information represents the return addresses. Accordingly, it is possible to obtain information for identifying stack frames without correcting a call stack.

Furthermore, the present invention includes the following technical features: a model obtaining unit is connected to a model storing unit (a memory, a cache, or the like) in which function models are stored for a certain time period. Then, the model obtaining unit adds identifiers to the obtained function models, and records the obtained function models to which the identifiers are added, in the model storing unit. The model discard unit transmits, to the model storing unit, a discard instruction for specifying a function model to be discarded by using the identifier. As a result, function models to be discarded can be identified.

Industrial Applicability

The present invention makes it possible to provide a software behavior modeling apparatus, a software behavior monitoring apparatus, a software behavior modeling method, and a software behavior monitoring method, which can accurately detect attacks from outside the computer, and can reduce time overhead and space overhead.

What is claimed is:

1. A software behavior modeling apparatus, comprising:
a stack information recording unit configured
to obtain i-th stack frame information for identifying a first stack frame stacked on a call stack at a time when a specific event occurs and (i−1)-th stack frame information for identifying a second stack frame stacked on the call stack at a time before the specific event occurs during the execution of software under a software execution environment, while specifying an order that the first and second stack frame are stacked on the call stack, and
to record the first stack frame information in an order of an occurrence of the specific event;
a termination information recording unit configured
to compare, sequentially from a bottom of the call stack, (i−1)-th stack information with i-th stack information both recorded by the stack information recording unit, where i represents a natural number, and
to record termination information indicating a boundary between an identical portion and a non-identical portion, the identical portion indicating a portion where the (i−1)-th stack information and the i-th stack information are identical and have a same position on the call stack, the non-identical portion indicating a portion following the first and second stack frame in which a difference is detected between the (i−1)-th stack information and the i-th stack information;
a first stack difference information generating unit configured to generate, by a computer, stack difference information formed between the (i−1)-th stack information and the i-th stack information, the stack difference information being a combination of a portion of the (i−1)-th stack information with a portion of the i-th stack information, both portions being located from an uppermost stack frame to the termination information; and
a model generating unit configured to generate a software behavior model by taking a hash value of the stack difference information or deriving a correlation rule between an identifier of the specific event and the stack difference information.

2. The software behavior modeling apparatus according to claim 1, wherein
the termination information recording unit records termination information having a higher co-occurrence frequency with the identifier of the specific event and the termination information, together with the identifier of the specific event, based on a co-occurrence relationship between the identifier of the specific event and the termination information, and
the first stack difference information generating unit obtains termination information to be used for generating the stack difference information, from each of the termination information recorded by the termination information recording unit, by using the identifier of the specific event.

3. The software behavior modeling apparatus according to claim 1, wherein the termination information recording unit records, as the termination information, i-th stack frame information located at a position with respect to the bottom of the call stack within a time period based on a series of temporal stack information recorded in the stack information recording unit.

4. The software behavior modeling apparatus according to claim 3, wherein the termination information recording unit
determines a length of time during which the i-th stack frame information is located at the position with respect to the bottom of the call stack, and
records, as the termination information, the i-th stack frame information when the length of time is greater than a predetermined threshold.

5. The software behavior modeling apparatus according to claim 1, further comprising:
a model obtaining unit configured to obtain a software behavior model for a software to be monitored, the software behavior model being generated by the model generating unit;
a termination information obtaining unit configured to obtain the termination information recorded by the termination information recording unit;
a stack information obtaining unit configured to suspend obtaining the i-th stack frame information from the call stack when the termination information transmitted from the termination information obtaining unit is detected in searching the call stack, and to record the i-th stack frame information in the order of the occurrence of the specific event;
a second stack difference information generating unit configured to generate stack difference information formed between the (i−1)-th stack information and the i-th stack information, the stack difference information being a combination of portion of the (i−1)-th stack information and a portion of the i-th stack information, both of the (i−1)-th stack information and the i-th stack information being obtained by the stack information obtaining unit; and
a behavior monitoring unit configured to determine a difference between the stack difference information generated by the second stack difference information generating unit and the software behavior model obtained by the model obtaining unit.

6. The software behavior modeling apparatus according to claim 1, wherein the first and second stack frame information is a return address.

7. A software behavior monitoring apparatus, comprising:
a model obtaining unit configured to obtain a function model for each specific events issued by a software to be monitored, the function model indicating a co-occurrence relation between a function call and an order of an issuance of an arbitrary function return, executed between specific events issued by a software to be monitored;
a termination information obtaining unit configured to obtain termination information of the software to be monitored under a software execution environment;
a stack information obtaining unit configured
to obtain i-th stack frame information for identifying a first stack frame stacked on a call stack at a time when a specific event occurs and (i−1)-th stack frame information for identifying a second stack frame stacked on a call stack at a time before the specific event occurs in executing the software, while specifying an order that the first and second stack frame are stacked on the call stack,
to suspend obtaining the first stack frame information from the call stack when the termination information transmitted from the termination information obtaining unit is detected in searching the call stack, and to record the first stack frame information in an order of an occurrence of the specific event;
a stack difference information generating unit configured to generate, by a computer, stack difference information formed between the (i−1)-th stack information and the i-th stack information, the stack difference information being a combination of a portion of the (i−1)-th stack information and a portion of the i-th stack information, both of the (i−1)-th stack information and the i-th stack information being obtained by the stack information obtaining unit; and
a behavior monitoring unit configured to determine a difference between the stack difference information generated by the stack difference information generating unit and the software behavior model obtained by the model obtaining unit.

8. The software behavior monitoring apparatus according to claim 7, further comprising
a model discard unit configured to discard the function model recorded by the model obtaining unit,
wherein
the model obtaining unit obtains the function model that indicates a call relation between functions, the call relation being generated in advance for each of functions from codes of the software to be monitored,
the behavior monitoring unit determines the difference between the stack difference information generated by the stack difference information generating unit and the function model obtained by the model obtaining unit,
the stack information obtaining unit suspends obtaining the first stack frame information when the termination information transmitted from the termination information obtaining unit is detected in searching the call stack, and
the model discard unit discards the function model that is recorded by the model obtaining unit for monitoring previously generated stack difference information, when the stack information obtaining unit suspends obtaining the i-th stack frame information.

9. The software behavior monitoring apparatus according to claim 7, wherein the termination information recording unit records, as the termination information, i-th stack frame information located at a position with respect to the bottom of the call stack within a time period based on a series of temporal stack information recorded in the stack information obtaining unit.

10. The software behavior monitoring apparatus according to claim 9, wherein the termination information obtaining unit
determines a length of time during which the i-th stack frame information is located at the position with respect to the bottom of the call stack, and
obtains, as the termination information, the i-th stack frame information when the length of time is greater than a predetermined threshold.

11. The software behavior monitoring apparatus according to claim 7, wherein the model discard unit determines an amount of a memory currently used by a system, and determines whether or not to discard the function model by using the termination information.

12. The software behavior monitoring apparatus according to claim 7, further comprising
a model storing unit configured to store the function model, wherein
the model obtaining unit adds an identifier to an obtained function model, and records, in the model storing unit, the obtained function model to which the identifier is added, and
the model discard unit transmits, to the model storing unit, a discard instruction for specifying a function model to be discarded, by using the identifier.

13. A software behavior modeling method implemented by a software behavior modeling apparatus, comprising:
obtaining i-th stack frame information for identifying a first stack frame stacked on a call stack at a time when a specific event occurs and (i−1)-th stack frame information for identifying a second stack frame stacked on a call stack at a time before the specific event occurs during the execution of software under a software execution environment, while specifying an order that the first and second stack frame are stacked on the call stack;
recording the i-th stack frame information in an order of an occurrence of the specific event;
comparing, sequentially from a bottom of the call stack, (i−1)-th stack information with i-th stack information, where i represents a natural number;
recording termination information indicating a boundary between an identical portion and a non-identical portion, the identical portion indicating a portion where the (i−1)-th stack information and a i-th stack information are identical and have a same position on the call stack, the non-identical portion indicating a portion following a stack frame in which a difference is detected between the (i−1)-th stack information and the i-th stack information;
generating, by a computer and as stack difference information, information formed between the (i−1)-th stack information and the i-th stack information, the stack difference information being a combination of a portion of the (i−1)-th stack information with a portion of the i-th stack information, both of the portions being located from an uppermost stack frame to the termination information; and generating a software behavior model by taking a hash value of the stack difference information or deriving a correlation rule between an identifier of the specific event and the stack difference information.

14. A software behavior monitoring method implemented by a software behavior modeling apparatus, comprising:

obtaining specific events, and a behavior model for each specific event, the behavior model indicating a co-occurrence relation between a function call and an order of an issuance of an arbitrary function return, executed between the specific events issued by a software to be monitored;

obtaining termination information of the software to be monitored, under a software execution environment;

obtaining i-th stack frame information for identifying a first stack frame stacked on a call stack at a time when a specific event occurs and (i−1)-th stack frame information for identifying a second stack frame stacked on a call stack at a time before the specific event occurs in executing a software, while specifying an order that the first stack frame is stacked on the call stack;

suspending obtaining of the first stack frame information from the call stack when the termination information transmitted from the termination information obtaining unit is detected in searching the call stack;

recording the first stack frame information in an order of an occurrence of the specific event;

generating, by a computer and as stack difference information, information formed between the (i−1)-th stack information and the i-th stack information, the stack difference information being a combination of a portion of (i−1)-th stack information and a portion of i-th stack information, both of the (i−1)-th stack information and the i-th stack information being obtained by the stack information obtaining unit; and determining a difference between the stack difference information generated by the stack difference information generating unit, and the software behavior model obtained by the model obtaining unit.

\* \* \* \* \*